(12) United States Patent
Shiina

(10) Patent No.: US 12,189,678 B2
(45) Date of Patent: Jan. 7, 2025

(54) FILE PROCESSING DEVICE, FILE PROCESSING METHOD, AND PROGRAM

(71) Applicant: Sony Group Corporation, Tokyo (JP)

(72) Inventor: Hiroki Shiina, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 42 days.

(21) Appl. No.: 17/909,057

(22) PCT Filed: Feb. 22, 2021

(86) PCT No.: PCT/JP2021/006574
§ 371 (c)(1),
(2) Date: Sep. 2, 2022

(87) PCT Pub. No.: WO2021/182089
PCT Pub. Date: Sep. 16, 2021

(65) Prior Publication Data
US 2023/0104640 A1 Apr. 6, 2023

(30) Foreign Application Priority Data

Mar. 9, 2020 (JP) ................................ 2020-039880

(51) Int. Cl.
| | | |
|---|---|---|
| *G06F 17/30* | (2006.01) | |
| *G06F 16/51* | (2019.01) | |
| *G06F 16/583* | (2019.01) | |
| *H04N 5/92* | (2006.01) | |
| *H04N 19/423* | (2014.01) | |

(52) U.S. Cl.
CPC ............ *G06F 16/51* (2019.01); *G06F 16/583* (2019.01); *H04N 5/92* (2013.01); *H04N 19/423* (2014.11)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,006,231 A * 12/1999 Popa .................... G06F 16/9577
709/219
6,624,909 B1 * 9/2003 Czyszczewski ... H04N 1/00244
358/1.15
(Continued)

FOREIGN PATENT DOCUMENTS

| JP | 2016015669 A | 1/2016 |
| JP | 2017017447 A | 1/2017 |

OTHER PUBLICATIONS

Petri Ihantola, Lasse Heikkila High Efficiency Image File Format Implementation, 61 pages, May 4, 2016.*
(Continued)

*Primary Examiner* — Hung D Le
(74) *Attorney, Agent, or Firm* — Michael Best & Friedrich LLP

(57) ABSTRACT

The present technology relates to a file processing device, a file processing method, and a program that enable efficient reproduction of a HEIF file.
A high efficiency image file format (HEIF) file in which a related image associated with an image in the HEIF file is arranged in a top part of an mdat box is generated. Additionally, a top part of such a HEIF file is read. The present technology can be applied to generation and reproduction of a HEIF file.

18 Claims, 18 Drawing Sheets

(56) References Cited

U.S. PATENT DOCUMENTS

| | | | | |
|---|---|---|---|---|
| 6,813,621 | B1* | 11/2004 | Taylor, III | G06F 16/116 707/999.102 |
| 2003/0133024 | A1* | 7/2003 | Ohnishi | H04N 1/00127 348/231.3 |
| 2007/0067468 | A1* | 3/2007 | Hyodo | G11B 20/12 |
| 2007/0146758 | A1* | 6/2007 | Lee | H04N 1/00912 358/1.13 |
| 2010/0169390 | A1* | 7/2010 | Park | H04N 21/2343 707/822 |
| 2011/0276662 | A1* | 11/2011 | Kim | H04L 65/70 709/219 |
| 2012/0054370 | A1* | 3/2012 | Tsubakihara | H04N 21/85406 709/246 |
| 2012/0288257 | A1* | 11/2012 | Katsumata | H04N 9/8042 386/E5.028 |
| 2013/0110977 | A1* | 5/2013 | Hong | H04H 20/82 709/218 |
| 2013/0167184 | A1* | 6/2013 | Hong | H04N 21/23614 725/109 |
| 2014/0341546 | A1* | 11/2014 | Hamada | G11B 27/034 386/282 |
| 2016/0150241 | A1* | 5/2016 | Hirabayashi | H04N 21/85406 375/240.21 |
| 2018/0152662 | A1 | 5/2018 | Takahashi | |
| 2019/0141102 | A1* | 5/2019 | Rhyu | H04N 21/85406 |
| 2020/0357439 | A1* | 11/2020 | Akiyoshi | H04N 19/70 |
| 2021/0029422 | A1* | 1/2021 | Aksu | H04N 21/8456 |

OTHER PUBLICATIONS

International Search Report (PCT/ISA/210), International Application No. PCT/JP2021/006574, dated May 18, 2021.

ISO/IEC 23008-12:2017, Information technology—High efficiency coding and media delivery in heterogeneous environments—Part 12: Image File Format.

"Text of ISO/IEC FDIS 23008-12 2nd edition", 117. MPEG Meeting; Jan. 16, 2017-Jan. 20, 2017; Geneva; (Motion Picture Expert Group or ISO/IEC JTC1/SC29/WG11), No. n16657 Mar. 27, 2017 (Mar. 27, 2017), XP030023325.

Cyril Concolato (Telecom-Paristech) et al:"Image File Format—Example and Whitepaper update", 113. MPEG Meeting; Oct. 19, 2015-Oct. 23, 2015;Geneva; (Motion Picture Expert Group or ISO/IEC JTC1/SC29/WG11),.

Hannuksela Miska M et al: "The High Efficiency Image File Format Standard [Standards in a Nutshell]", IEEE Signal Processing Magazine, IEEE,USA, vol. 32, No. 4, Jul. 1, 2015 (Jul. 1, 2015), pp. 150-156, XP011584508.

* cited by examiner

FILE PROCESSING DEVICE, FILE PROCESSING METHOD, AND PROGRAM

TECHNICAL FIELD

The present technology relates to a file processing device, a file processing method, and a program, and particularly relates to, for example, a file processing device, a file processing method, and a program that enable efficient reproduction of a HEIF file.

BACKGROUND ART

As a file format for efficiently storing images, there is a high efficiency image file format (HEIF) (see Non-Patent Document 1).

CITATION LIST

Non-Patent Document

Non-Patent Document 1: ISO/IEC 23008-12:2017, Information technology—High efficiency coding and media delivery in heterogeneous environments—Part 12: Image File Format

SUMMARY OF THE INVENTION

Problems to be Solved by the Invention

In the future, for a HEIF file, efficient reproduction of the HEIF file such as high-speed display of thumbnail images will be required.

The present technology has been made in view of such a situation, and enables efficient reproduction of a HEIF file.

Solutions to Problems

A first file processing device or a first program of the present technology is a file processing device including a file control unit that generates a high efficiency image file format (HEIF) file in which a related image associated with an image in the HEIF file is arranged in a top part of an mdat box, or a program for causing a computer to function as such a file processing device.

A first file processing method of the present technology is a file processing method including generating a high efficiency image file format (HEIF) file in which a related image associated with an image in the HEIF file is arranged in a top part of an mdat box.

In the first file processing device, the first file processing method, and the first program of the present technology, the high efficiency image file format (HEIF) file in which the related image associated with the image in the HEIF file is arranged in the top part of the mdat box is generated.

A second file processing device or a second program of the present technology is a file processing device including a file control unit that reads a top part of a high efficiency image file format (HEIF) file in which a related image associated with an image in the HEIF file is arranged in a top part of an mdat box, or a program for causing a computer to function as such a file processing device.

A second file processing method of the present technology is a file processing method including reading a top part of a high efficiency image file format (HEIF) file in which a related image associated with an image in the HEIF file is arranged in a top part of an mdat box.

In the second file processing device, the second file processing method, and the second program of the present technology, the top part of the high efficiency image file format (HEIF) file in which the related image associated with the image in the HEIF file is arranged in the top part of the mdat box is read.

Note that the file processing device may be an independent device, or may be an internal block included in one device.

The program can be provided by being recorded on a recording medium or being transmitted through a transmission medium.

MODE FOR CARRYING OUT THE INVENTION

<One Embodiment of Digital Camera to which Present Technology is Applied>

Figure 1:
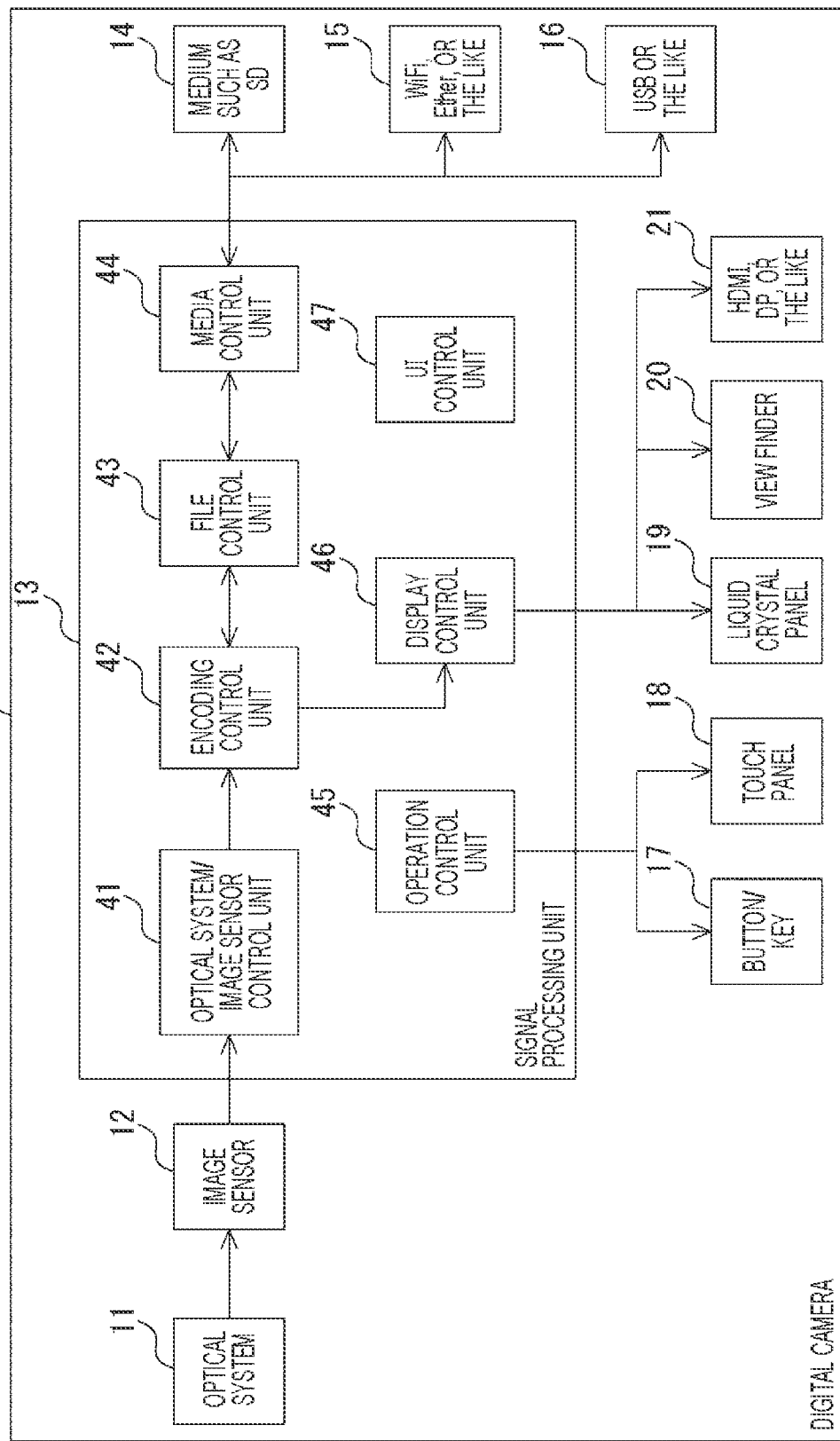
FIG. 1 is a block diagram illustrating a configuration example of one embodiment of a digital camera to which the present technology is applied.

FIG. 1 is a block diagram illustrating a configuration example of one embodiment of a digital camera to which the present technology is applied.

A digital camera 10 includes an optical system 11, an image sensor 12, a signal processing unit 13, a medium 14, interfaces (I/F) 15 and 16, a button/key 17, a touch panel 18, a liquid crystal panel 19, a view finder 20, an I/F 21, and the like.

The optical system 11 condenses light from a subject on the image sensor 12.

The image sensor 12 receives light from the optical system 11, performs imaging by photoelectric conversion, generates image data as an electric signal, and supplies the image data to the signal processing unit 13.

The signal processing unit 13 includes an optical system/image sensor control unit 41, an encoding control unit 42, a file control unit 43, a media control unit 44, an operation control unit 45, a display control unit 46, and a UI control unit 47.

The optical system/image sensor control unit 41 controls the optical system 11 and the image sensor 12, and supplies (data of) an image obtained by imaging performed in accordance with the control to the encoding control unit 42.

The encoding control unit 42 supplies the image from the optical system/image sensor control unit 41 to the display control unit 46, encodes the image as necessary, and supplies the image to the file control unit 43. Additionally, the encoding control unit 42 decodes the image supplied from the file control unit 43 as necessary, and supplies the image to the display control unit 46.

The file control unit 43 generates a file storing the image supplied from the encoding control unit 42, and supplies the file to the media control unit 44. Additionally, the file control unit 43 reproduces the file supplied from the media control unit 44, that is, reads data such as an image stored in the file, and the like. For example, an image read from the file is supplied from the file control unit 43 to the encoding control unit 42.

The media control unit 44 controls exchange of files with the medium 14 and the I/Fs 15 and 16. For example, the media control unit 44 causes a file from the file control unit 43 to be recorded on the medium 14 or to be transmitted from the I/Fs 15 and 16. Additionally, the media control unit 44 reads a file from the medium 14, or causes the I/Fs 15 and 16 to receive a file and supplies the file to the file control unit 43.

The operation control unit 45 supplies an operation signal corresponding to an operation to a necessary block according to the operation of the button/key 17 or the touch panel 18 by the user.

The display control unit 46 performs display control and the like to supply an image and the like supplied from the encoding control unit 42 to the liquid crystal panel 19, the view finder 20, and the I/F 21 to display.

The UI control unit 47 manages user interface (UI) control.

The medium 14 is, for example, a storage medium such as an SD card. The I/F 15 is, for example, an I/F of a local area network (LAN) such as Wi-Fi (registered trademark) or Ethernet (registered trademark). The I/F 16 is, for example, a universal serial bus (USB) I/F. The button/key 17 and the touch panel 18 are operated by the user when inputting a command or other information to the digital camera 10. The touch panel 18 can be formed integrally with the liquid crystal panel 19. The liquid crystal panel 19 and the view finder 20 display an image and the like supplied from the display control unit 46. The I/F 21 is an I/F that transmits at least an image such as a high-definition multimedia interface (HDMI) (registered trademark) or a display port (DP).

In the digital camera 10 configured as described above, the optical system/image sensor control unit 41 generates, from an image of RAW data (hereinafter also referred to as RAW image) obtained by imaging by the image sensor 12, an image of YUV having the same resolution (number of pixels) (size) as that of the RAW image, for example, and supplies the image to the encoding control unit 42 together with the RAW image. The encoding control unit 42 generates a master image or the like of the HEIF file from the YUV image from the optical system/image sensor control unit 41. For example, the YUV image from the optical system/image sensor control unit 41 can be directly used as the master image of the HEIF file.

The encoding control unit 42 generates, from the master image of YUV, an image of YUV (hereinafter also referred to as screennail image) having a resolution lower than that of the master image, for example, as a first other image based on the master image for use in display on the liquid crystal panel 19 or an external display, and generates an image of YUV (hereinafter also referred to as thumbnail image) having a resolution lower than that of the screennail image, for example, as a second other image based on the master image for use in index display (list display). For example, the encoding control unit 42 supplies the screennail image to the liquid crystal panel 19 via the display control unit 46 to display the screennail image as a so-called through-the-lens image. As the thumbnail image, for example, an image having a size of 320 pixels or less on the long side can be adopted. The ratio of the size (number of pixels) between the master image and the screennail image as the first other image based on the master image or the thumbnail image as the second other image based on the master image can be, for example, 200 times or less. The ratio of the size between the screennail image as the first other image based on the master image and the thumbnail image as the second other image based on the master image may also be 200 times or less. As the screennail image, for example, an image having a resolution of 4K or more can be adopted. Additionally, as the screennail image, for example, a 4K (QFHD) or FHD image can be adopted according to the user's selection. Furthermore, images having the same resolution can be adopted as the master image and the screennail image. In a case where images having the same resolution are adopted as the master image and the screennail image, both the master image and the screennail image can be stored in the HEIF file, or the master image can be stored without storing the screennail image. In a case where the master image is stored in the HEIF file without storing the screennail image, the master image can be resized and used as a screennail image.

Additionally, the encoding control unit 42 encodes a master image, a screennail image, and a thumbnail image corresponding to a RAW image (main image, screennail image, and thumbnail image generated from same RAW image) as necessary, and supplies them to the file control unit 43 together with the RAW image.

The file control unit 43 generates a RAW file storing a RAW image, a HEIF file storing a corresponding master image, screennail image, and thumbnail image (main image, screennail image, and thumbnail image generated from same RAW image), and/or a JPEG file, for example, as necessary, and supplies the generated file to the media control unit 44. A HEIF file is a file conforming to high efficiency image file format (HEIF), and a JPEG file is a file conforming to joint photographic experts group (JPEG).

Under the control of the file control unit 43, the media control unit 44 records (writes) the RAW file, the HEIF file, or the JPEG file from the file control unit 43 on the medium 14, or transmits the RAW file, the HEIF file, or the JPEG file from the I/F 15 or 16.

The type (e.g., RAW file, HEIF file, JPEG file, and the like) of the file to be generated by the file control unit 43 can be selected according to a user's operation (designation), for example. Additionally, as will be described later, a HEIF file includes an image item format and an image sequence format. Which one of the image item format and the image sequence format is adopted can be selected according to a user's operation, for example. Furthermore, the file control unit 43 can perform the mutual conversion between a HEIF file and a JPEG file according to the user's operation.

Additionally, the file control unit 43 can generate a plurality of files having the same image content and having different codecs, image sizes (resolutions), color formats, and bit depths.

In a case where the file control unit 43 generates a plurality of files having the same image content, the encoding control unit 42 generates an image stream (file stream) to be stored in each of the plurality of files from a YUV image from the optical system/image sensor control unit 41.

The encoding control unit 42 can generate image streams having different codecs, image sizes (resolutions), color formats, and bit depths.

For example, the encoding control unit 42 can generate an image of a predetermined size, a predetermined color format, and a predetermined bit depth from a YUV image supplied from the optical system/image sensor control unit 41, and generate a first stream obtained by encoding the image with a predetermined codec (encoding method). Furthermore, the encoding control unit 42 can generate an image having another size, another color format, and another bit depth from the same YUV image supplied from the optical system/image sensor control unit 41, and generate a second stream obtained by encoding the image with another codec.

Then, the file control unit 43 can generate a file storing the first stream and a file storing the second stream.

<JPEG File>

Figure 2:
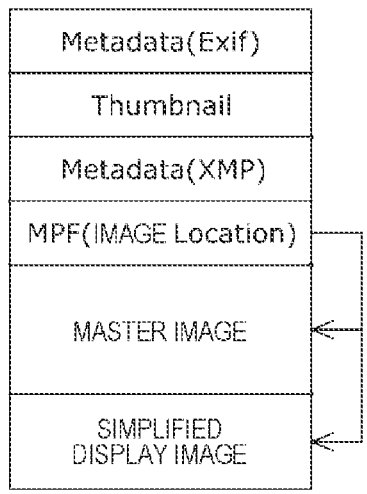
FIG. 2 is a diagram illustrating an example of a format of a joint photographic experts group (JPEG) file compliant with JPEG.

FIG. 2 is a diagram illustrating an example of a format of a joint photographic experts group (JPEG) file compliant with JPEG.

A JPEG file is configured to store, for example, (data of) Exif (EXIF), a thumbnail image, (data of) extensible metadata platform (XMP) (registered trademark), MPF representing storage positions (locations) of a master image and a simplified display image, a master image, and a simplified display image. As the simplified display image, a screennail image can be adopted, for example.

<ISO Base Media File Format>

Figure 3:
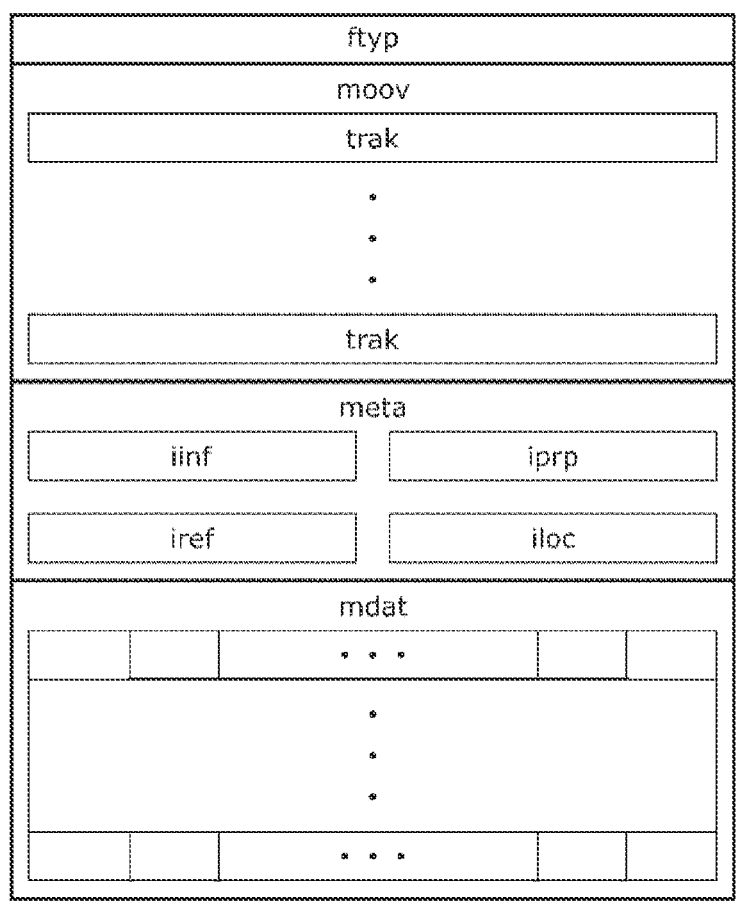
FIG. 3 is a diagram illustrating an example of an ISO base media file format.

FIG. 3 is a diagram illustrating an example of an ISO base media file format.

HEIF (ISO/IEC 23008-12) is a file format conforming to the ISO base media file format (ISO/IEC 14496-12), and therefore, a HEIF file conforms to the ISO base media file format.

The ISO base media file format includes units called boxes as containers for storing data, and has a structure called a box structure.

Boxes include a type (box type), actual data (data), and the like. A type indicates the type of actual data in the box. Reproducible media data such as an image (still image, moving image), audio, and subtitles, an attribute name (field name) and an attribute value (field value) of (variable represented by) the attribute name, and various other data can be adopted as actual data.

Furthermore, a box can be adopted as actual data. That is, a box can have a box as actual data, and thus a hierarchical structure can be formed.

A base media file conforming to the ISO base media file format can include an ftyp box, a moov box (MovieBox), a meta box (MetaBox), an mdat box (MediaDataBox), and the like. An ftyp box stores identification information for identifying a file format. A moov box can store a trak box and the like. A meta box can store an iinf box, an iprp box, an iref box, an iloc box, and the like. An mdat box can store media data (AV data) and other arbitrary data.

HEIF conforms to the ISO base media file format as described above.

<HEIF File>

Figure 4:
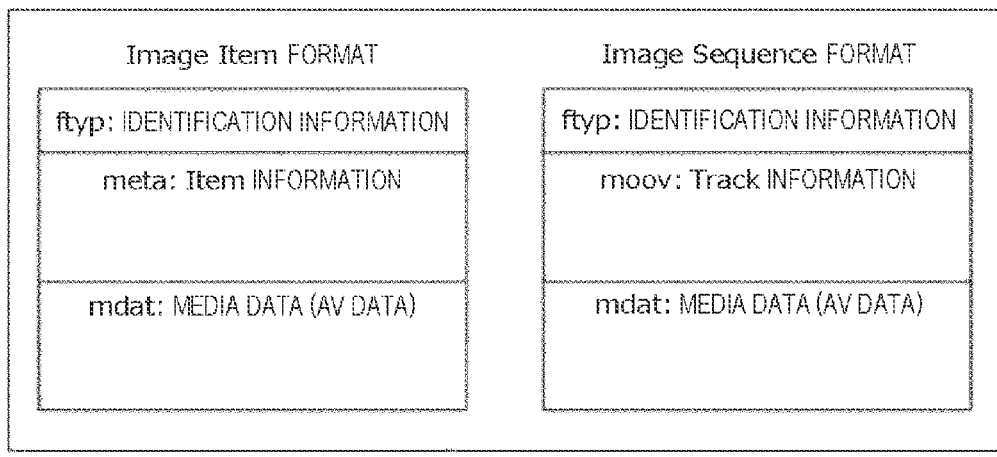
FIG. 4 is a diagram illustrating an example of a format of a HEIF file conforming to HEIF.

FIG. 4 is a diagram illustrating an example of a format of a HEIF file conforming to HEIF.

HEIF files are roughly divided into an image item format and an image sequence format. Furthermore, the image item format includes a single image format having only one item, which will be described later, and an image collection format having a plurality of items.

A HEIF file in the image item format includes an ftyp box, a meta box, and an mdat box.

A HEIF file in the image sequence format includes an ftyp box, a moov box, and an mdat box.

Note that a HEIF file can include not only one of the meta box and the moov box but also both of them.

The ftyp box stores identification information for identifying a file format, such as whether the file is a HEIF file in an image item format or an image sequence format.

The meta box and the moov box store metadata necessary for reproduction, management, and the like of media data stored in the mdat box such as metadata of a storage location or the like of media data The mdat box stores media data (AV data) and the like.

In the digital camera 10, it is possible to select which of a HEIF file in the image item format and a HEIF file in the image sequence format is to be generated according to the user's operation, for example. Additionally, in a case of encoding and storing an image in the mdat box of a HEIF file, only intra encoding is permitted for the image item format, and intra encoding and inter encoding are permitted for the image sequence format. Therefore, for example, in a case where priority is given to high-speed access to data stored in the HEIF file, generation of a HEIF file in the image item format can be selected, and in a case where priority is given to reducing the size (data amount) of the HEIF file, generation of a HEIF file in the image sequence format can be selected.

Figure 5:
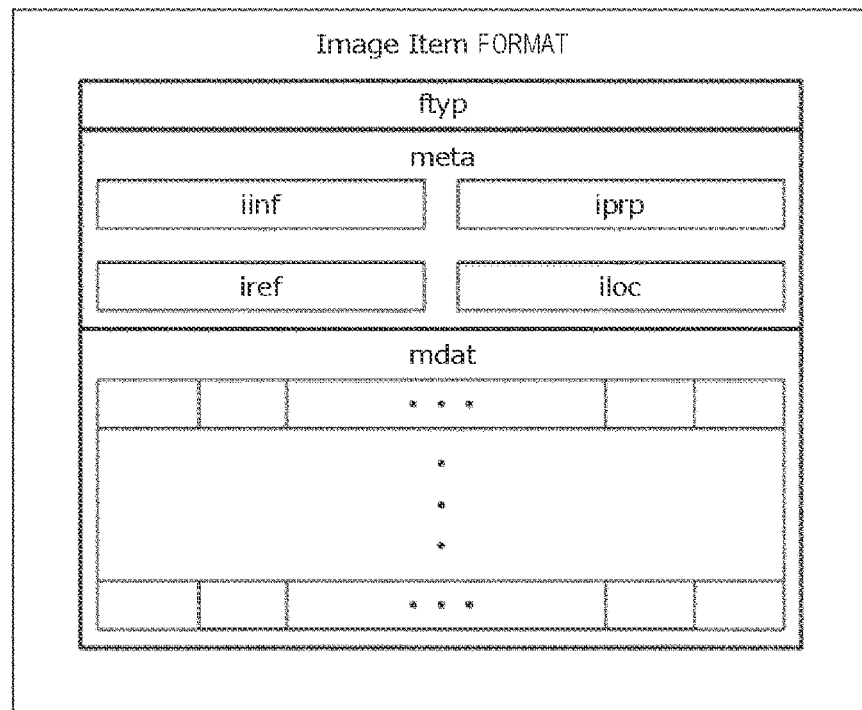
FIG. 5 is a diagram illustrating an example of a format of a HEIF file in an image item format.

FIG. 5 is a diagram illustrating an example of a format of a HEIF file in an image item format.

In a HEIF file in the image item format, the ftyp box stores (as attribute value), for example, information such as mif1 indicating that the HEIF file is in the image item format.

The meta box stores an iinf box, an iref box, an iprp box, and an iloc box.

The iinf box stores (attribute name and attribute value representing) the number of items, for example, of media data (AV data) or the like stored in the mdat box. An item is one data stored in the mdat box of a HEIF file in the image item format, and for example, one image (screen) is an item. In the present specification, one image is also referred to as a frame regardless of whether it is a still image or a moving image. One frame is one item.

The iref box stores information indicating the association among items. For example, the mdat box can store each of a corresponding master image, screennail image, and thumbnail image as an item. In a case where the mdat box stores an item I1 as a master image, an item I2 as a screennail image, and an item I3 as a thumbnail image, the iref box stores information indicating that the item I2 is a screennail image of the master image as the item I1 and information indicating that the item I3 is a thumbnail image of the master image as the item I1.

The ipp box stores information regarding properties of an item.

The iloc box stores information regarding the storage location of an item stored in the mdat box.

The mdat box (of the HEIF file) in the image item format stores, for example, a frame of an image as an item. The mdat box can store one or more items. Additionally, the mdat box can encode and store a frame as an item. Note, however, that the encoding of a frame as an item stored in the mdat box in the image item format is limited to intra encoding. As an encoding method (codec) for encoding a frame as an item, for example, HEVC or the like can be adopted.

Figure 6:
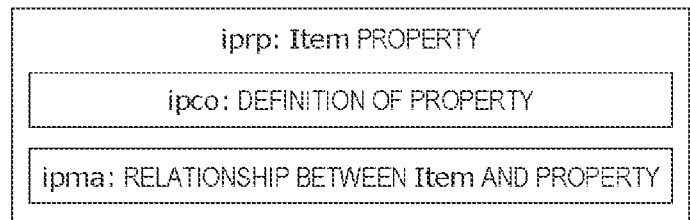
FIG. 6 is a diagram illustrating an example of an iprp box.

FIG. 6 is a diagram illustrating an example of the iprp box in FIG. 5.

The iprp box stores an ipco box and an ipma box related to properties of items. The ipco box stores properties of an item stored in the mdat box such as codec information regarding the codec of an image as an item and image size information regarding the size of the image as an item. The ipma box stores indices (pointers) of items stored in the mdat box to properties stored in the ipco box.

Figure 7:
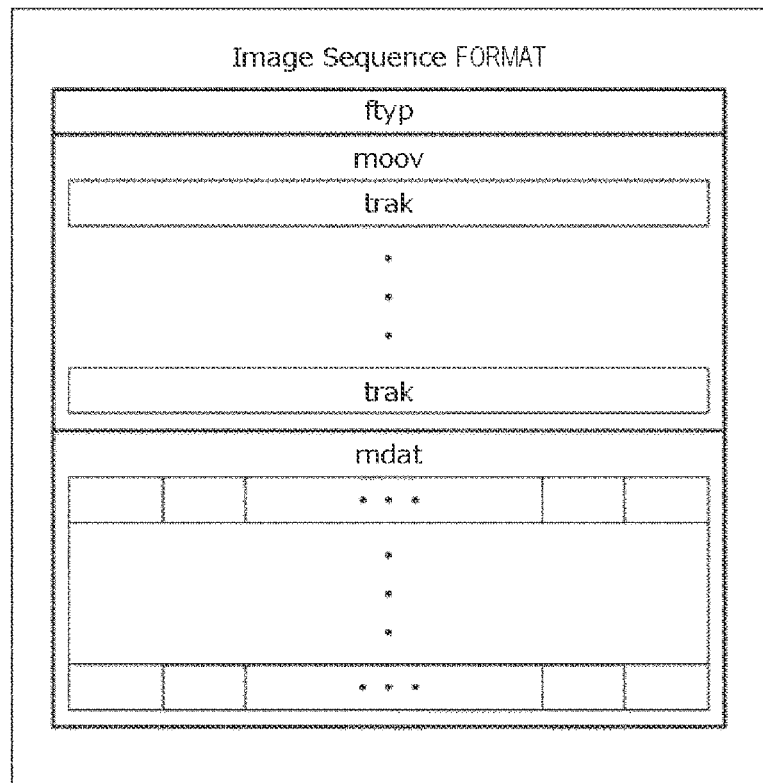
FIG. 7 is a diagram illustrating an example of a format of a HEIF file in an image sequence format.

FIG. 7 is a diagram illustrating an example of a format of a HEIF file in an image sequence format.

In a HEIF file in the image sequence format, the ftyp box stores, for example, information such as msf1 indicating that the HEIF file is in the image sequence format.

The moov box stores a trak box. The trak box stores information regarding a track stored in the mdat box.

A track includes one independent piece of media data reproduced according to a timeline, such as an image or sound. For example, a track includes one or more frames of images that form an elementary stream. As for the track stored in the mdat box, a plurality of tracks, such as tracks of an image and sound recorded at the same time, can be reproduced at the same time.

Media data of the track is configured in units called samples. A sample is a minimum unit (access unit) in a case where media data in a HEIF file is accessed. Therefore, media data in a HEIF file cannot be accessed in units smaller than samples.

For image media data, for example, one frame or the like is one sample. Additionally, for sound media data, for example, one audio frame or the like defined in the standard of the sound media data is one sample.

In the mdat box (of HEIF file) in the image sequence format, media data of a track is arranged in units called chunks. A chunk is a set of one or more samples arranged at logically continuous addresses.

In a case where the mdat box stores a plurality of tracks as media data, the plurality of tracks is interleaved and arranged in units of chunks.

As described above, the mdat box in the image sequence format stores one or more tracks including media data of an image, sound, or the like.

The mdat box can encode and store frames of images included in a track. In the encoding of frames included in a track stored in the mdat box of the image sequence format, long GOP can be adopted as a group of picture (GOP), and both intra encoding and inter encoding can be adopted. As a codec for encoding frames included in a track, HEVC or the like can be adopted, for example.

Figure 8:
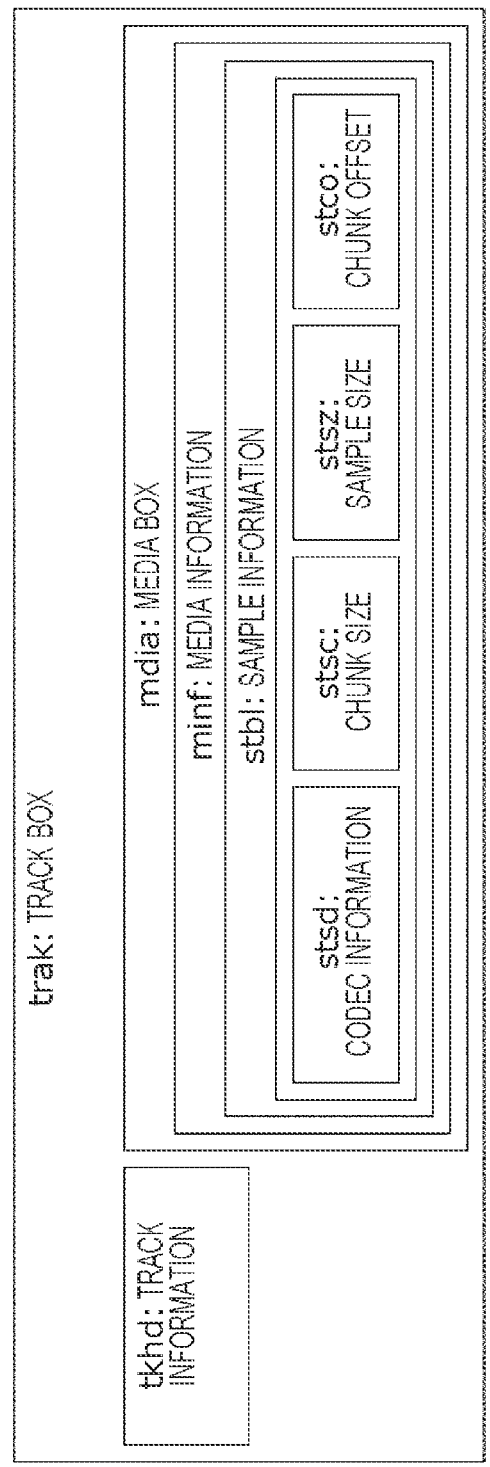
FIG. 8 is a diagram illustrating an example of a trak box.

FIG. 8 is a diagram illustrating an example of the trak box.

The trak box can store the tkhd box and the mdia box. The tkhd box stores header information of a track such as the creation date and time of a track managed by the trak box. The mdia box stores an minf box and the like. The minf box stores an stbl box. The stbl box stores an stsd box, an stsc box, an stsz box, and an stco box that store a sample of a track, and consequently information for accessing a chunk. The stsd box stores codec information regarding the codec of the track. The stsc box stores a chunk size (number of samples per chunk). The stsz box stores a sample size. The stco box stores a chunk offset, that is, the offset of the arrangement location of each chunk of a track stored in the mdat box.

Here, a HEIF file in the image item format is also referred to as a collection file, and a HEIF file in the image sequence format is also referred to as a sequence file.

In the digital camera 10, it is possible to generate a HEIF file storing a master image and one or both of a necessary screennail image and thumbnail image.

<Collection File>

Figure 9:
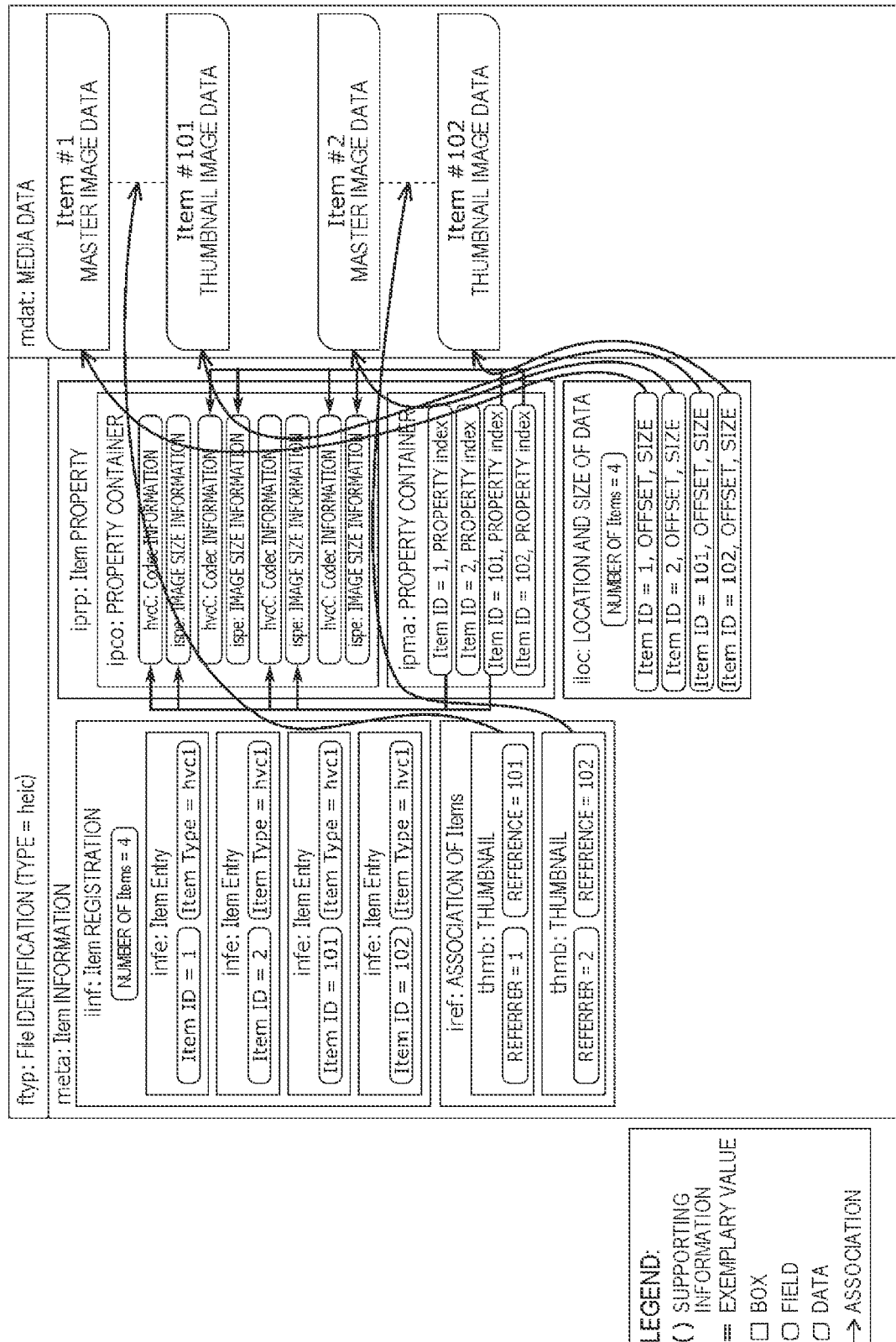
FIG. 9 is a diagram illustrating an example of a collection file storing a master image and a thumbnail image.

FIG. 9 is a diagram illustrating an example of a collection file storing a master image and a thumbnail image.

Here, assume that a frame (item) is encoded by HEVC and stored in the mdat box of the collection file.

The ftyp box stores, as identification information for identifying the file format, heic indicating that the format is the image item format and that the codec is HEVC.

The iinf box stores the number of items stored in the mdat box. In FIG. 9, the mdat box stores a total of four items (frames) including a master image (hereinafter also described as master image Item #1) identified by an item ID #1, a master image Item #2, the thumbnail image (hereinafter also described as thumbnail image Item #101) identified by an item ID #101, and a thumbnail image Item #102. Therefore, the number of items is four. Note that the thumbnail image Item #101 is a thumbnail image of the master image Item #1, and the thumbnail image Item #102 is a thumbnail image of the master image Item #2.

The iinf box further stores an infe box for each item stored in the mdat box, for example. In the infe box, an item ID for identifying an item and an item type are registered. In FIG. 9, there are infe boxes of the master images Item #1 and Item #2 and the thumbnail images Item #101 and Item #102.

The iref box stores, for example, a thmb box as information for associating items stored in the mdat box. The thmb box stores, in association with each other, a referrer and a reference as information for associating a master image with a thumbnail image of the master image. In the thmb box, the referrer represents an item ID of a master image, and the reference represents an item ID of a thumbnail image of the master image identified by the item ID of the referrer. Therefore, according to the reference associated with the referrer, the item ID of a thumbnail image of a master image identified by the item ID represented by the referrer can be recognized. Additionally, according to the referrer associated with the reference, the item ID of a master image of a thumbnail image specified by the item ID represented by the reference can be recognized.

As described in FIG. 6, the iprp box stores the ipco box and the ipma box. As described in FIG. 6, the ipco box stores properties of a frame as an item stored in the mdat box such as codec information regarding a codec and image size information regarding size. As described in FIG. 6, the ipma box stores indices of items stored in the mdat box to properties stored in the ipco box.

As described in FIG. 6, the iloc box stores information regarding the storage location of items in the mdat box. In FIG. 9, the iloc box stores that the number of items is four. Furthermore, the iloc box stores the size and offset to the storage place of each of the master images Item #1 and Item #2 and the thumbnail images Item #101 and Item #102 stored in the mdat box in association with the item ID.

<Sequence File>

Figure 10:
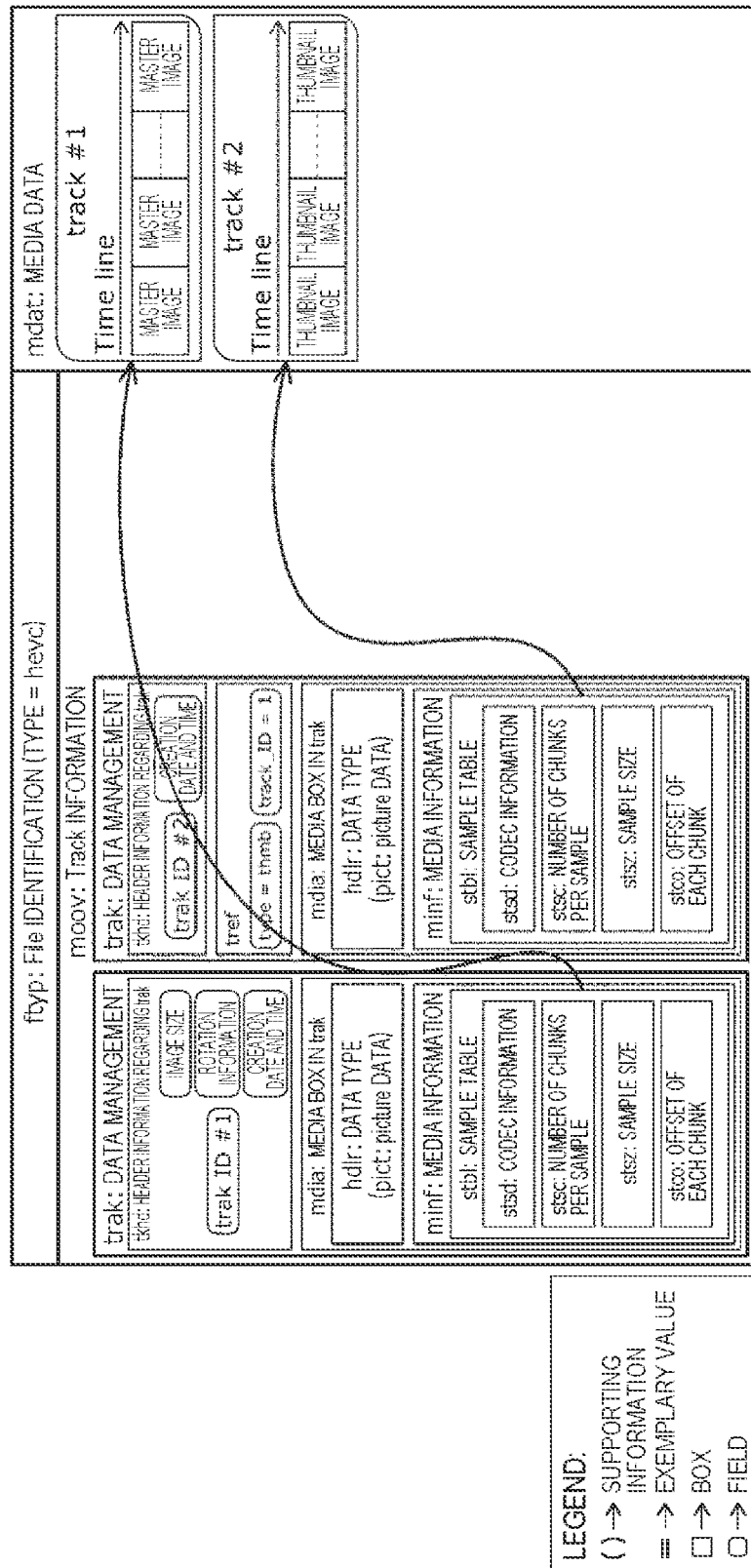
FIG. 10 is a diagram illustrating an example of a sequence file storing a track of a master image and a track of a thumbnail image of the master image.

FIG. 10 is a diagram illustrating an example of a sequence file storing a track of a master image and a track of a thumbnail image of the master image.

Here, assume that a frame is encoded by HEVC and stored in the mdat box of the sequence file.

The ftyp box stores, as identification information for identifying the file format, hevc indicating that the format is the image sequence format and that the codec is HEVC.

As described in FIG. 7, the moov box stores the trak box that manages each track stored in the mdat box. In FIG. 10, the mdat box stores a track (hereinafter also described as track #1) of a master image identified by a track ID #1 and a track #2 of a thumbnail image of the master image of the track #1. Therefore, the moov box stores a trak box that manages the track #1 and a trak box that manages the track #2. (The frame of) the nth thumbnail image (from the top) of the track #2 is a thumbnail image of the nth master image of the track #1.

When continuous shooting is performed by the digital camera 10, for example, the sequence file is useful in a case where master images and thumbnail images of a plurality of frames obtained by the continuous shooting are recorded as one track.

The tkhd box of the trak box that manages the track #1 of the master image stores the track ID #1 that identifies the track #1, an image size of the master image included in the track #1, rotation information indicating the direction of the digital camera 10 when the master image is captured, and a creation date and time of the track #1. The tkhd box of the trak box that manages the track #2 of the thumbnail image stores the track ID #2 that identifies the track #2 and a creation date and time of the track #2.

In addition to the tkhd box and the mdia box described in FIG. 7, the trak box can store a tref box. The tref box stores a track ID for identifying another track associated with the track managed by the trak box in which the tref box is stored, information indicating the content of the track, and the like. In FIG. 10, the tref box is provided in the trak box that manages the track #2. Then, the tref box stores information indicating that another track related to the track #2 is the track #1 (track ID=1) and that data included in the track #2 is a thumbnail image (that track #2 is track of thumbnail image) (type=thmb).

In addition to the minf box described in FIG. 8, the mdia box of the trak box can store an hdlr box. The hdlr box stores information indicating the type of data included in the track managed by the trak box in which the hdlr box is stored. The hdlr box stored (in mdia box stored) in the trak box that manages the track #1 of the master image stores information (pict) indicating that data included in the track #1 is a picture (frame), and the hdlr box stored in the trak box that manages the track #2 of the thumbnail image stores information indicating that data included in the track #2 is a picture.

The minf box is as described in FIG. 8.

<Generation and Reproduction of HEIF File>

Figure 11:
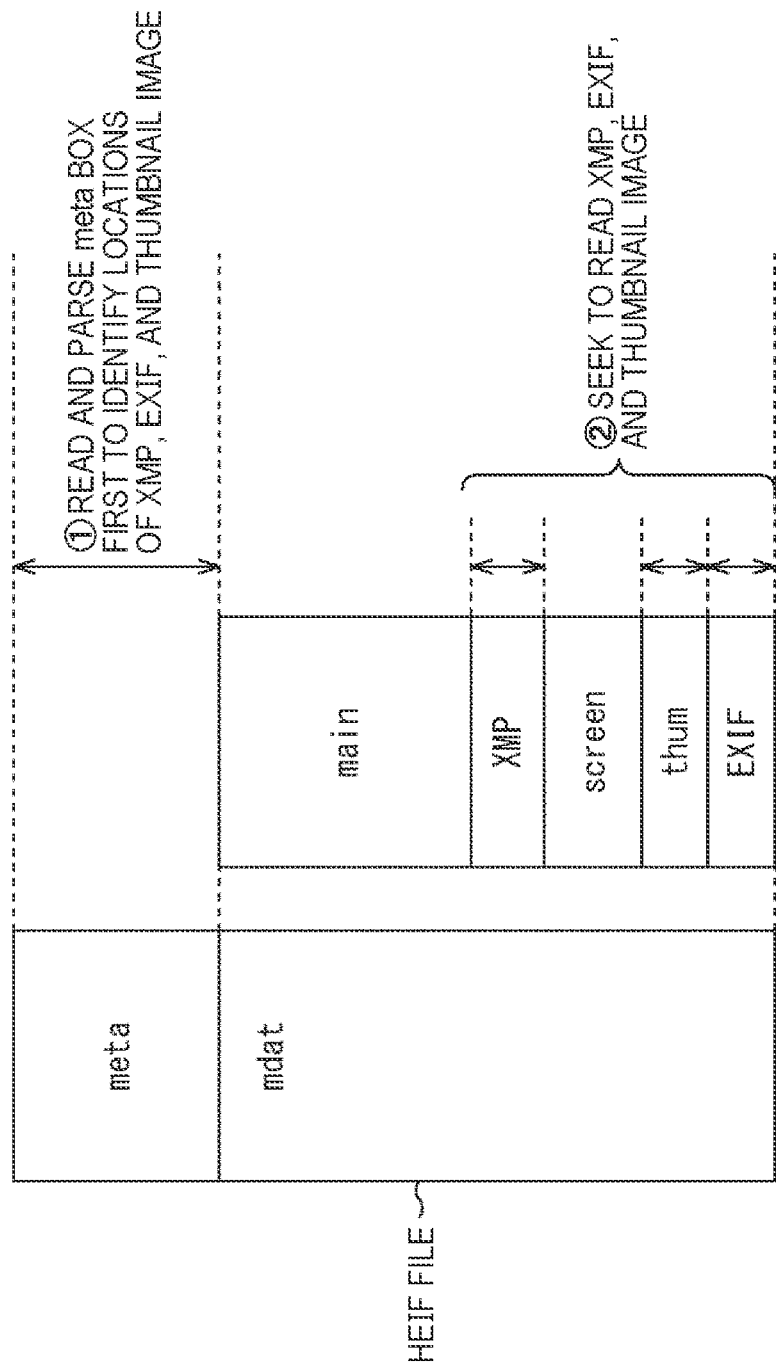
FIG. 11 is a diagram illustrating a first example of generation and reproduction of a HEIF file by a file control unit 43.

FIG. 11 is a diagram illustrating a first example of generation and reproduction of a HEIF file by the file control unit 43.

Note that while a case where a HEIF file in the image item format is adopted as the HEIF file to be generated and reproduced will be described hereinbelow as an example, the present technology can also be applied to a HEIF file in the image sequence format. Note that in a case where the present technology is applied to a HEIF file in the image sequence format, the meta box in the following description is replaced with the moov box. Moreover, in addition to the HEIF file, the present technology can be applied to an arbitrary file that stores, for example, a thumbnail image or the like as a related image associated with an image stored in the file.

FIG. 11 illustrates a HEIF file storing image-related data associated with a master image of one frame.

Image-related data associated with a master image is a set of data associated with the master image stored in the mdat box together with the master image, and is, for example, a set of a master image main, a screennail image screen, a thumbnail image thum, and an extensible metadata platform (XMP) and an exchangeable image file format (EXIF) as metadata. Components such as the master image main included in image-related data are also referred to as element data.

Among element data included in image-related data, the screennail image screen and the thumbnail image thum have a smaller data amount, number of pixels, and resolution than the master image main, but are images having the same content as the master image main, and can be regarded as related images associated with the master image main.

The file control unit 43 generates, as a HEIF file storing image-related data associated with a master image of one frame, a HEIF file in which the master image main, the screennail image screen, the thumbnail image thum, the XMP, and the EXIF are arranged (arranged and stored) in the order of the master image main, the XMP, the screennail image screen, the thumbnail image thum, and the EXIF from the top of the mdat box.

As the reproduction of the HEIF file in which the image-related data is arranged as described above, for example, in a case of reproducing the thumbnail image, the file control unit 43 reads and parses (analyzes) the meta box of the HEIF file to identify locations of the thumbnail image thum, the XMP, and the EXIF stored in the mdat box. Then, the file control unit 43 seeks the mdat box of the HEIF file (sets desired read/write location to file pointer which is variable representing read/write location of file, for example), and reads the thumbnail image thum, the XMP, and the EXIF from the location after seeking.

As described above, the display control unit 46 displays the thumbnail image thum read from the HEIF file and the necessary metadata (such as imaging date and time) in the XMP and the EXIF.

The HEIF does not particularly specify the order of storing element data included in image-related data in the mdat box. Therefore, element data included in image-related data can be arranged in the mdat box in an arbitrary order.

In the present technology, by specifying the arrangement of element data, in a use case at the time of reproduction, such as a case of displaying a thumbnail image, displaying a screennail image, performing partial transfer or the like of transferring only some types of element data of image-related data, it is possible to efficiently reproduce a HEIF file and quickly acquire element data such as a thumbnail image to perform high-speed display of the thumbnail image.

Figure 12:
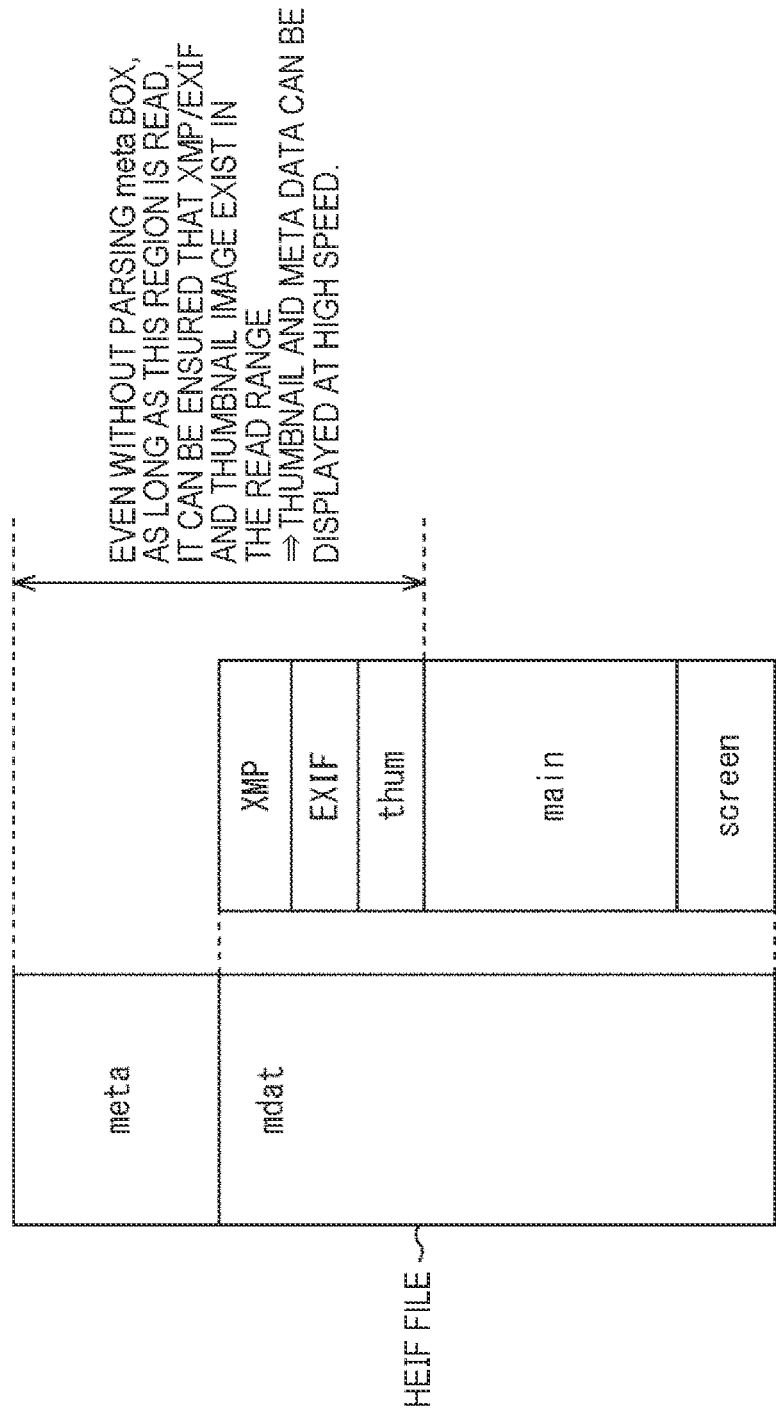
FIG. 12 is a diagram illustrating a second example of generation and reproduction of a HEIF file by the file control unit 43.

FIG. 12 is a diagram illustrating a second example of generation and reproduction of a HEIF file by the file control unit 43.

Similarly to FIG. 11, FIG. 12 illustrates a HEIF file storing image-related data associated with a master image of one frame.

In FIG. 12, the arrangement order of a master image main, a screennail image screen, a thumbnail images thum, XMP, and EXIF as image-related data associated with a master image of one frame is specified in the order of the XMP, the EXIF, the thumbnail image thum, the master image main, and the screennail image screen.

For this reason, the file control unit 43 generates, as a HEIF file storing image-related data associated with a master image of one frame, a HEIF file in which the master image main, the screennail image screen, the thumbnail image thum, the XMP, and the EXIF are arranged in the order of the XMP, the EXIF, the thumbnail image thum, the master image main, and the screennail image screen from the top of the mdat box.

As described above, in FIG. 12, the HEIF file in which the XMP and the EXIF as metadata and the thumbnail image thum are arranged in a top part of the mdat box is generated.

At the time of reproduction of the HEIF file, as preprocessing, the file control unit 43 reads data of a predetermined data amount (e.g., 128 Kbytes, 256 Kbytes, or the like) from a top part of the HEIF file such as the top of the HEIF file to at least a location exceeding the meta box to read data of the meta box and a top part of the mdat box following the meta box, and develops (stores) the read data in a built-in memory (not illustrated) such as a built-in RAM.

In a case where image-related data is arranged in the order of XMP, EXIF, a thumbnail image thum, a master image main, and a screennail image screen from the top of the mdat box, the XMP, the EXIF, and the thumbnail image thum arranged at the top part of the mdat box are developed in the built-in memory together with the meta box by preprocessing by the file control unit 43.

Therefore, the file control unit 43 can parse the metadata box on-memory and read the XMP, the EXIF, and the thumbnail image thum arranged in the top part of the mdat box on the built-in memory according to the parsing result, and thereby acquire the XMP, the EXIF, and the thumbnail image thum quickly. As a result, the XMP, the EXIF, and the thumbnail image thum can be displayed at high speed, and the HEIF file can be reproduced efficiently.

Figure 13:
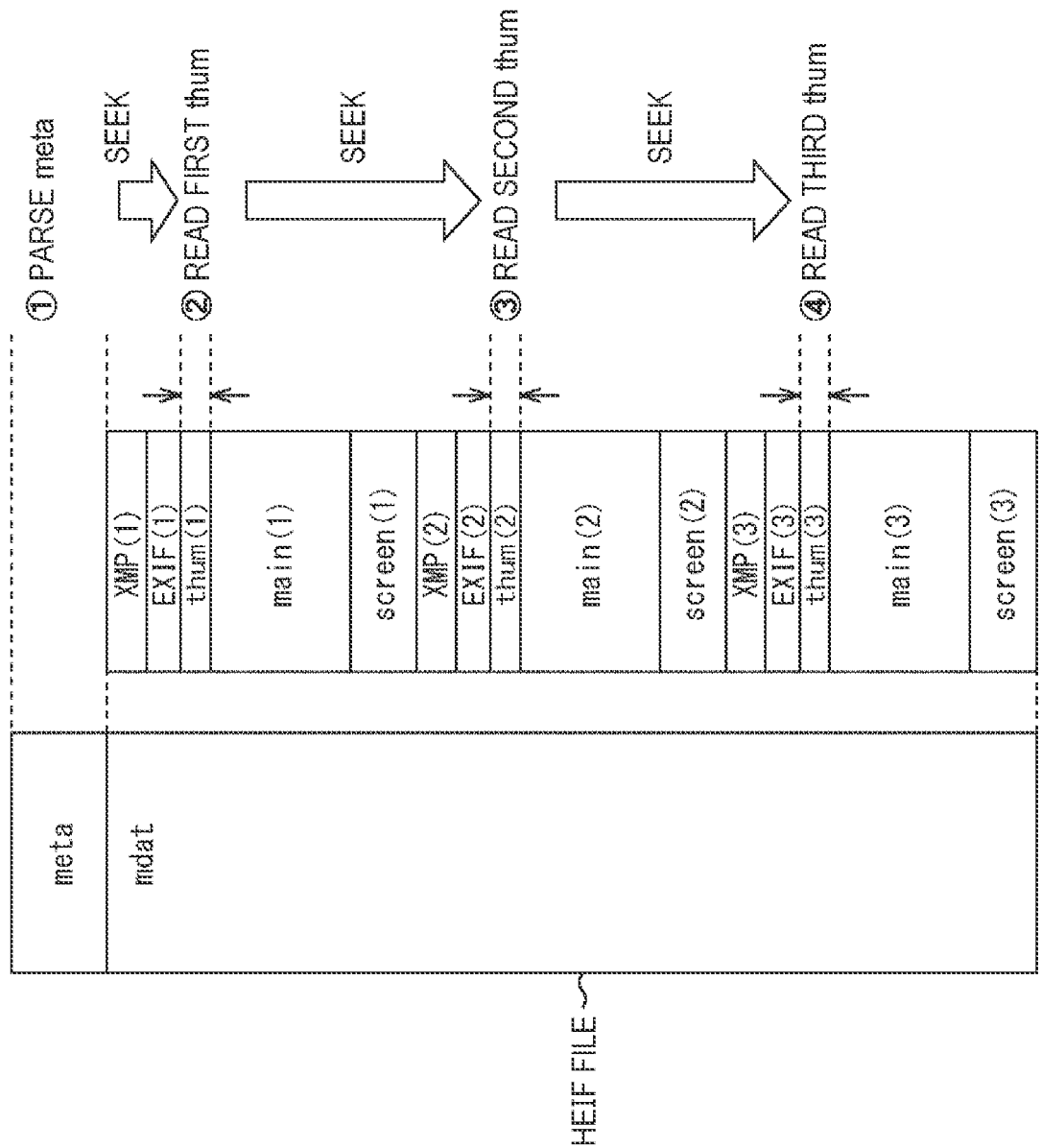
FIG. 13 is a diagram illustrating a third example of generation and reproduction of a HEIF file by the file control unit 43.

FIG. 13 is a diagram illustrating a third example of generation and reproduction of a HEIF file by the file control unit 43.

FIG. 13 illustrates a HEIF file storing image-related data associated with master images of three frames, for example, as a plurality of frames.

In FIG. 13, similarly to the case of FIG. 12, the arrangement order of element data included in the image-related data is specified in the order of XMP, EXIF, a thumbnail image thum, a master image main, and a screennail image screen.

For this reason, in FIG. 13, the file control unit 43 generates a HEIF file in which a set of a master image main (1), a screennail image screen (1), a thumbnail image thum (1), XMP (1), and EXIF (1) which are image-related data of the master image main (1), a set of a master image main (2), a screennail image screen (2), a thumbnail image thum (2), XMP (2), and EXIF (2) which are image-related data of the master image main (2), and a set of a master image main (3), a screennail image screen (3), a thumbnail image thum (3), XMP (3), and EXIF (3) which are image-related data of the master image main (3), are each arranged in the mdat box in the order of the XMP, the EXIF, the thumbnail image thum, the master image main, and the screennail image screen.

Note, however, that in FIG. 13, the image-related data of the master image main (1), the image-related data of the master image main (2), and the image-related data of the master image main (3) are collectively stored for each piece of image-related data from the top of the mdat box in the order of the image-related data of the master images main (1), main (2), and main (3).

Here, assume that the file control unit 43 reproduces the thumbnail images, for example, as reproduction of the HEIF file of FIG. 13 without performing the preprocessing described in FIG. 12.

In this case, the file control unit 43 reads and parses the meta box of the HEIF file to sequentially identify the locations of the thumbnail images thum (1), thum (2), and thum (3) stored in the mdat box.

When the location of the thumbnail image thum (m) (where m=1, 2, 3) is identified by the progress of parsing of the meta box, the file control unit 43 seeks the mdat box of the HEIF file and reads the thumbnail image thum (m) from the location after seeking.

In FIG. 13, since the thumbnail image thum (m) is arranged together with other element data of the image-related data of the master image main (m), the thumbnail image thum (m) of a certain master image main (m) and the thumbnail image thum (m+1) of the next master image main (m+1) are arranged at locations greatly apart from each other. For this reason, at the time of reading the thumbnail images, a seek occurs every time a thumbnail is read, and it takes time to read all the thumbnail images from the HEIF file.

Next, assume that the file control unit 43 performs the preprocessing described with reference to FIG. 12 to reproduce the thumbnail images, for example, as reproduction of the HEIF file of FIG. 13.

In this case, at the time of reproduction of the HEIF file, the file control unit 43 reads data of a predetermined data amount from the top of the HEIF file in the preprocessing, and thereby reads data of the meta box and a top part of the mdat box following the meta box, and develops the read data in the built-in memory.

In the preprocessing, the meta box and, for example, the XMP (1), the EXIF (1), and the thumbnail image thum (1) of the master image main (1) at the top part of the mdat box following the meta box are developed in the built-in memory. Note, however, since the XMP (2), the EXIF (2), and the thumbnail image thum (2) of the master image main (2), and the XMP (2), the EXIF (3), and the thumbnail image thum (3) of the master image main (3) are arranged at locations away from the top part of the mdat box, they are not developed in the built-in memory depending on the preprocessing.

Therefore, the file control unit 43 can read thumbnail image thum (1) developed in the built-in memory from the built-in memory similarly to the case of FIG. 12, and can quickly acquire the thumbnail image thum (1).

On the other hand, the file control unit 43 needs to seek and read the mdat box of the HEIF file for the thumbnail images thum (2) and thum (3) which are not expanded in the built-in memory, similarly to the case where the preprocessing is not performed, and it takes time to read the thumbnail images thum (2) and thum (3).

Figure 14:
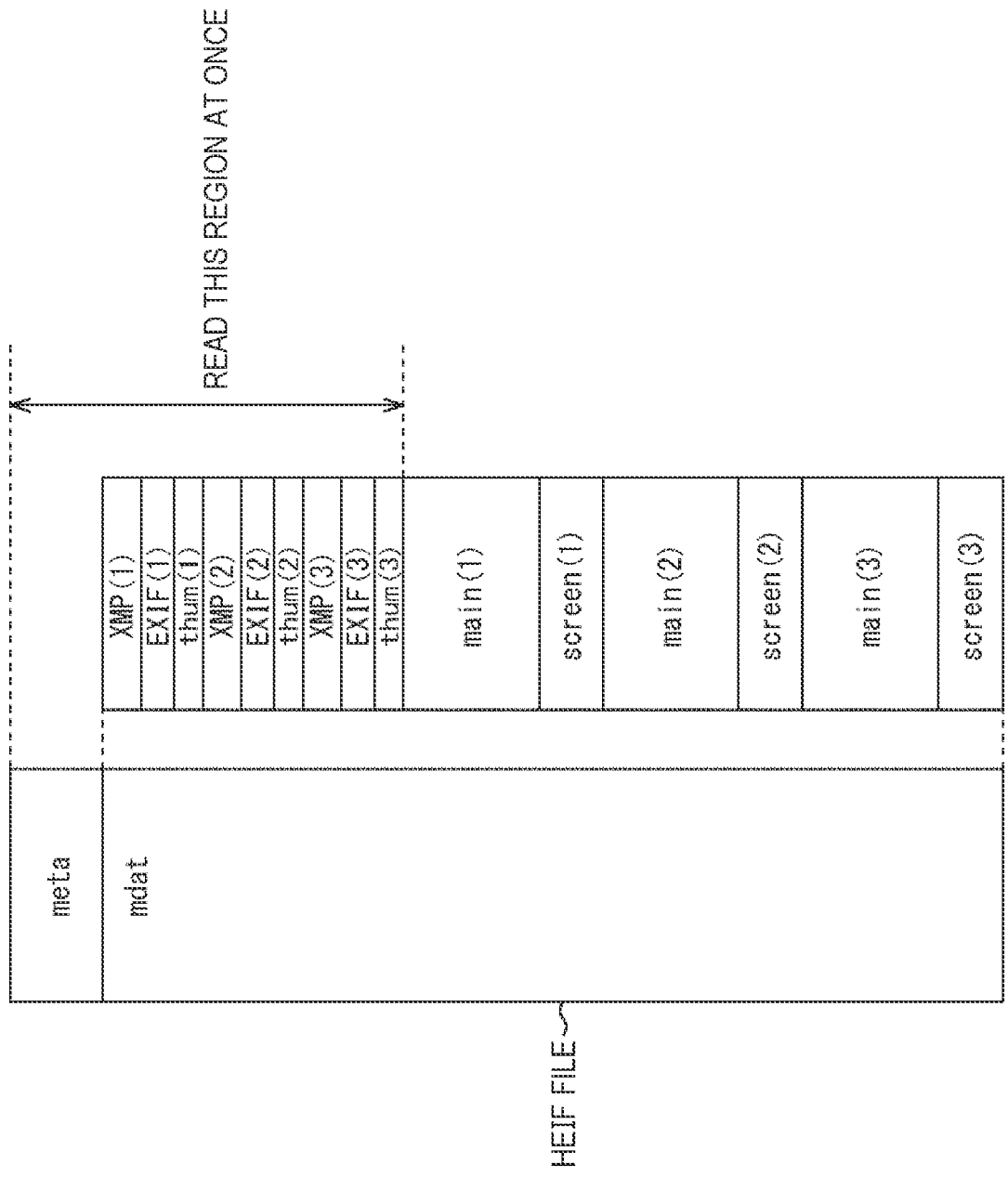
FIG. 14 is a diagram illustrating a fourth example of generation and reproduction of a HEIF file by the file control unit 43.

FIG. 14 is a diagram illustrating a fourth example of generation and reproduction of a HEIF file by the file control unit 43.

Similarly to FIG. 13, FIG. 14 illustrates a HEIF file storing image-related data associated with master images of three frames as a plurality of frames.

In FIG. 14, the arrangement order of element data in the image-related data is not specified, and XMP, EXIF, and a thumbnail image thum of the element data of the image-related data are arranged in a top part of the mdat box for all the image-related data stored in the HEIF file.

For this reason, in FIG. 14, the file control unit 43 generates a HEIF file in which, among a set of a master image main (1), a screennail image screen (1), a thumbnail image thum (1), XMP (1), and EXIF (1) which are image-related data of the master image main (1), a set of a master image main (2), a screennail image screen (2), a thumbnail image thum (2), XMP (2), and EXIF (2) which are image-related data of the master image main (2), and a set of a master image main (3), a screennail image screen (3), a thumbnail image thum (3), XMP (3), and EXIF (3) which are image-related data of the master image main (3), the XMP (1), the EXIF (1), the thumbnail image thum (1), the XMP (2), the EXIF (2), the thumbnail image thum (2), the XMP (3), the EXIF (3), and the thumbnail image thum (3) are arranged in the top part of the mdat box.

Note that the master image main (1), the screennail image screen (1), the master image main (2), the screennail image screen (2), the master image main (3), and the screennail image screen (3) are arranged subsequently.

At the time of reproduction of the HEIF file as described above, the file control unit 43 performs the preprocessing described in FIG. 12.

In the preprocessing, data of a predetermined data amount is read from the top of the HEIF file, so that data of the meta box and the top part of the mdat box following the meta box are read and developed in the built-in memory of the file control unit 43.

As a result, the meta box and, for example, the XMP (1), the EXIF (1), the thumbnail image thum (1), the XMP (2), the EXIF (2), the thumbnail image thum (2), the XMP (3), the EXIF (3), and the thumbnail image thum (3) in the top part of the mdat box following the meta box are developed in the built-in memory.

Therefore, the file control unit 43 can parse the meta box on-memory and read the thumbnail image thum (1), the thumbnail image thum (2), the thumbnail image thum (3), the XMP (1), the EXIF (1), the XMP (2), the EXIF (2), the XMP (3), and the EXIF (3) arranged in the top part of the mdat box on the built-in memory according to the parsing result, and thereby acquire the thumbnail image, the XMP, and the EXIF in the HEIF file quickly without seeking the HEIF file. As a result, the XMP, the EXIF, and the thumbnail image thum can be displayed at high speed, and the HEIF file can be reproduced efficiently.

Here, regarding all the image-related data stored in the HEIF file as illustrated in FIG. 14, a HEIF file in which, among the element data of the image-related data, at least an image having a smaller number of pixels (lower resolution) than the master image main, such as the thumbnail image thum, is arranged in a top part of the mdat box is referred to as a high-speed HEIF file. In a high-speed HEIF file, not only all the thumbnail images stored in the high-speed HEIF file but also all the EXIF and XMP which are metadata of the images can be arranged in the top part of the mdat box as illustrated in FIG. 14.

The HEIF file of FIG. 12 is a high-speed HEIF file because the image-related data related to the master image of one frame is stored, and the XMP, the EXIF, and the thumbnail image thum of the element data of the image-related data are arranged in the top part of the mdat box.

Therefore, a high-speed HEIF file can be applied regardless of whether the HEIF file stores image-related data associated with a master image of one frame or stores image-related data associated with master images of a plurality of frames. Note, however, that in a case where a HEIF file stores image-related data associated with master images of a plurality of frames, seeking is likely to occur frequently, and thus, the effect of adopting a high-speed HEIF file is large.

Note that in a high-speed HEIF file, the master image main is not arranged in a top part of the mdat box.

Additionally, in a high-speed HEIF file, as an image having a smaller number of pixels than the master image main, the screennail image screen can be arranged in the top part of the mdat box together with or instead of the thumbnail image thum. Note, however, that since the data amount of the screennail image screen is larger than that of the thumbnail image thum, in a case where the screennail image screen is arranged in the top part of the mdat box, the data amount read in the preprocessing and the memory capacity required for the built-in memory of the file control unit 43 become large.

In the preprocessing, for example, a preset fixed data amount can be adopted as the data amount of the data read from the top of the high-speed HEIF file.

Additionally, for example, an upper limit of the number of pieces of image-related data (number of master images) stored in a high-speed HEIF file can be set, and a data amount corresponding to the upper limit number can be adopted as a data amount of data read from the top of the high-speed HEIF file in preprocessing. For example, in a case where XMP, EXIF, and a thumbnail image thum are arranged in a top part of the mdat box for the upper limit number of pieces of image-related data, a data amount with which all of the XMP, the EXIF, and the thumbnail image thum can be read can be adopted as the data amount of data read from the top of the high-speed HEIF file in preprocessing.

Furthermore, a data amount according to the capacity of a built-in memory of the file control unit 43, for example, a data amount that can be allowed for the built-in memory can be adopted as the data amount read from the top of the high-speed HEIF file in preprocessing.

Here, for a high-speed HEIF file, by reading and parsing the meta box in preprocessing, it is possible to identify the data amounts of all of XMP, EXIF, and a thumbnail image thum arranged in a top part of the mdat box. Furthermore, by reading data of the identified data amount from the top of the mdat box, all of the XMP, the EXIF, and the thumbnail image thum arranged in the top part of the mdat box can be read and developed in the built-in memory of the file control unit 43.

Note, however, that in this case, reading from the top of the high-speed HEIF file is performed in two separate times including reading of the meta box and reading of the top part of the mdat box. Therefore, in this case, the number of times of reading data from the high-speed HEIF file is increased as compared with the case of simply reading data of a predetermined data amount from the top of the high-speed HEIF file.

Figure 15:
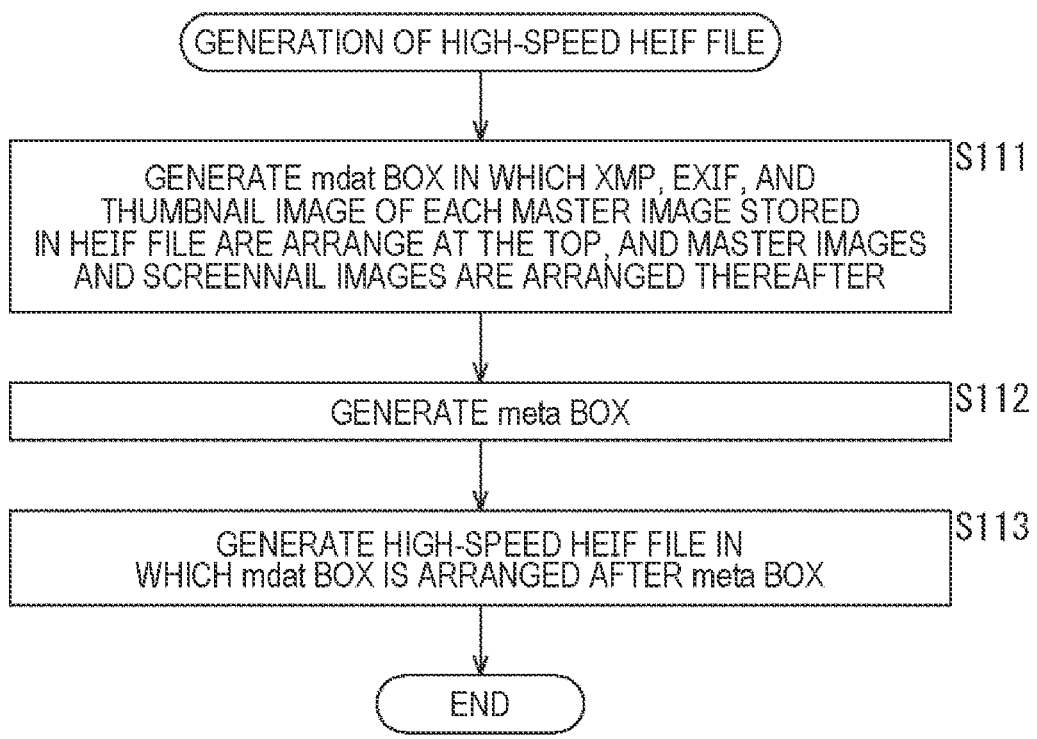
FIG. 15 is a flowchart illustrating an example of processing of generating a high-speed HEIF file.

FIG. 15 is a flowchart illustrating an example of processing of generating the high-speed HEIF file in FIG. 14.

In step S111, the file control unit 43 generates the mdat box in which XMP, EXIF, and a thumbnail image of each master image stored in the HEIF file are arranged at the top, and the master image and a screennail image are arranged thereafter, and the processing proceeds to step S112.

In step S112, the file control unit 43 generates a meta box storing metadata regarding (data of) the mdat box generated in step S111, and the processing proceeds to step S112.

In step S113, the file control unit 43 generates a high-speed HEIF file in which the mdat box generated in step S111 is arranged after the meta box generated in step S112, and ends the processing.

Figure 16:
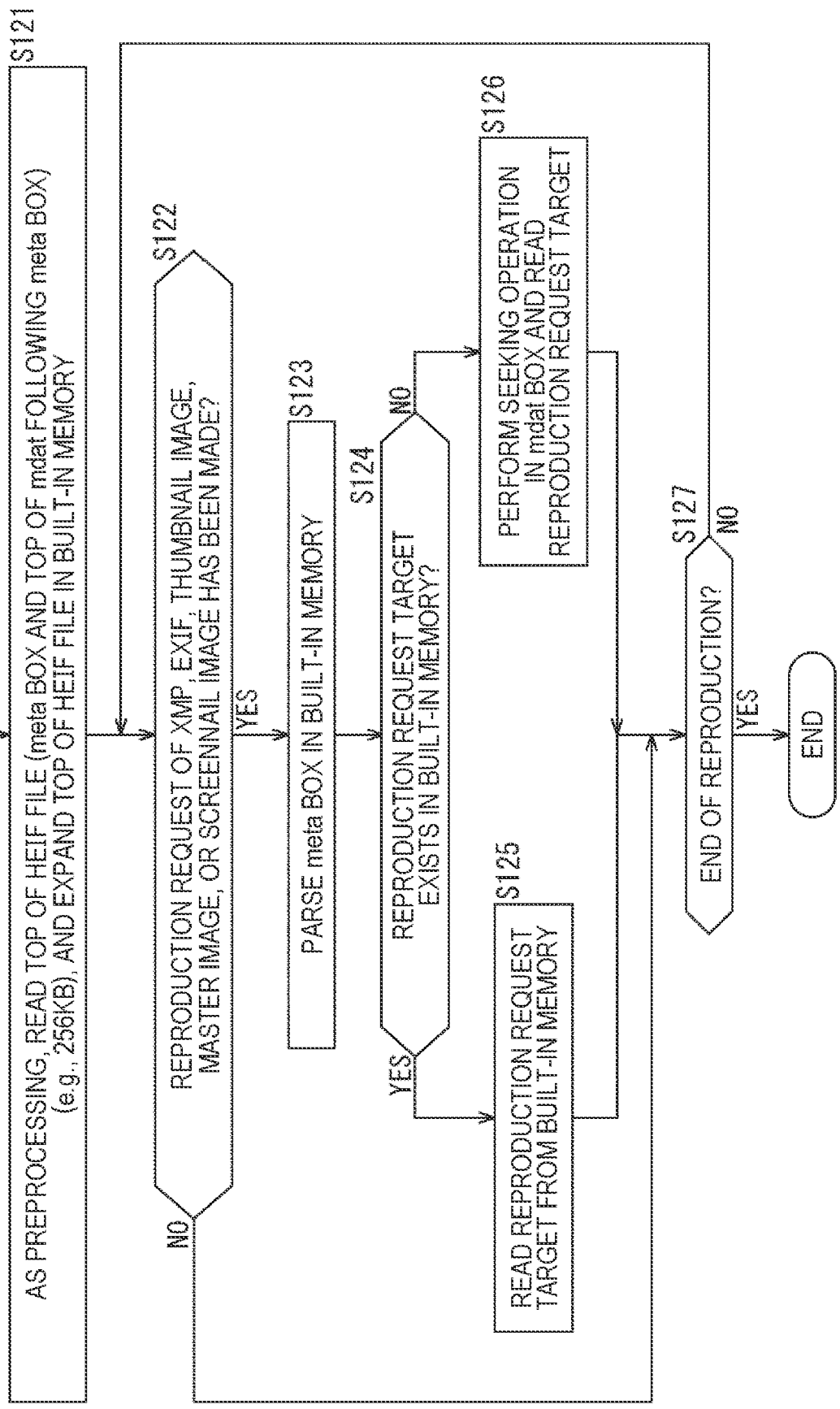
FIG. 16 is a flowchart illustrating an example of processing of reproducing a high-speed HEIF file.

FIG. 16 is a flowchart illustrating an example of processing of reproducing the high-speed HEIF file of FIG. 14.

In step S121, as preprocessing, the file control unit 43 reads data of a predetermined data amount (e.g., 256 Kbytes or the like) of the top part of the high-speed HEIF file, and thereby reads the meta box and the top part of the mdat box following the meta box. Furthermore, the file control unit 43 expands the meta box and the top part of the mdat box read from the high-speed HEIF file in the built-in memory, and the processing proceeds from step S121 to step S122.

In step S122, the file control unit 43 determines, for example, whether there is a reproduction request of element data, that is, XMP, EXIF, a thumbnail image, a master image, or a screennail image according to a user's operation or the like.

If it is determined in step S122 that there is no reproduction request, the processing proceeds to step S127.

Additionally, if it is determined in step S122 that there is a reproduction request, the processing proceeds to step S123.

In step S123, the file control unit 43 parses the meta box expanded in the built-in memory to identify the location of the target element data (hereinafter also referred to as reproduction request target) for which the reproduction request has been made in the mdat box, and the processing proceeds to step S124.

In step S124, the file control unit 43 determines whether a reproduction request target exists (is stored) in the built-in memory according to the location of the reproduction request target identified by parsing the meta box.

If it is determined in step S124 that the reproduction request target exists in the built-in memory, the processing proceeds to step S125. In step S125, the file control unit 43 reads the reproduction request target from the built-in memory, and the processing proceeds to step S127.

Additionally, if it is determined in step S124 that the reproduction request target does not exist in the built-in memory, the processing proceeds to step S126. In step S126, the file control unit 43 seeks the mdat box of the HEIF file according to the parsing result and reads the reproduction request target, and the processing proceeds to step S127.

In step S127, the file control unit 43 determines whether to end reproduction of the high-speed HEIF file.

If it is determined in step S127 not to end the reproduction of the high-speed HEIF file, the processing returns to step S122, and similar processing is repeated thereafter.

Additionally, if it is determined in step S127 to end the reproduction of the high-speed HEIF file, such as a case where the user operates the digital camera 10 so as to end the reproduction, the processing ends.

Figure 17:
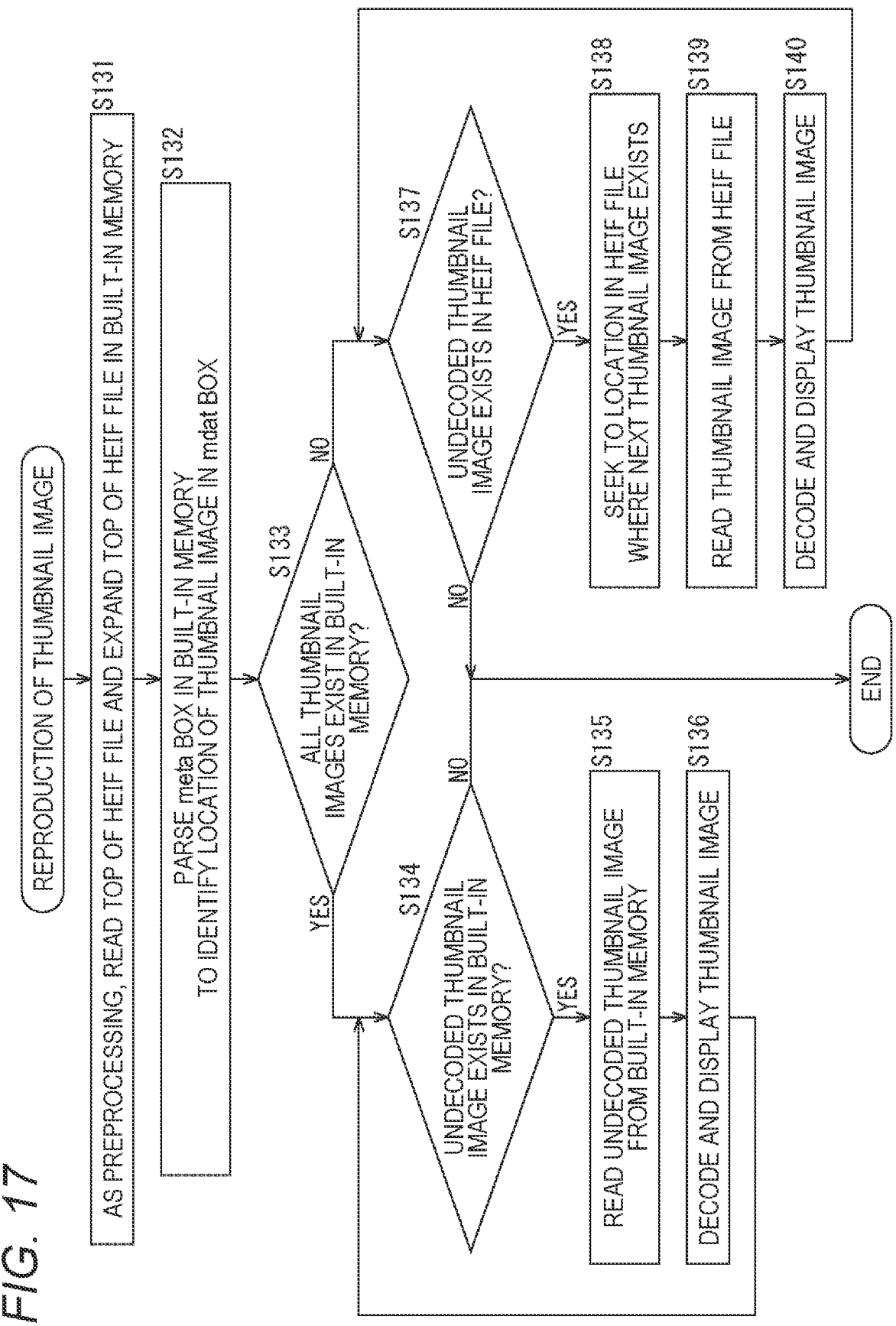
FIG. 17 is a flowchart illustrating an example of processing of reproducing all thumbnail images stored in a high-speed HEIF file.

FIG. 17 is a flowchart illustrating an example of processing of reproducing all thumbnail images stored in the high-speed HEIF file of FIG. 14.

In step S131, as preprocessing, the file control unit 43 reads data of a predetermined data amount in a top part of the high-speed HEIF file, and thereby reads the meta box and a top part of the mdat box following the meta box. Furthermore, the file control unit 43 expands the meta box and the top part of the mdat box read from the high-speed HEIF file in the built-in memory, and the processing proceeds from step S131 to step S132.

In step S132, the file control unit 43 parses the meta box expanded in the built-in memory to identify the location in the mdat box in which the thumbnail image exists, and the processing proceeds to step S133.

In step S133, the file control unit 43 determines whether all of the thumbnail images exist in the built-in memory according to the parsing result of the meta box.

If it is determined in step S133 that all of the thumbnail images exist in the built-in memory, the processing proceeds to step S134, and hereinafter, all of the thumbnail images stored in the built-in memory are reproduced.

That is, in step S134, the file control unit 43 determines whether an undecoded thumbnail image still exists in the built-in memory.

If it is determined in step S134 that an undecoded thumbnail image still exists in the built-in memory, the processing proceeds to step S135.

In step S135, the file control unit 43 reads one of the undecoded thumbnail images from the built-in memory, and the processing proceeds to step S136.

In step S136, the file control unit 43 causes the encoding control unit 42 to decode the thumbnail image read in the immediately preceding step S135 and causes the display control unit 46 to display the thumbnail image. Then, the processing returns from step S136 to step S134, and hereinafter, the processing of steps S134 to S136 is repeated until it is determined in step S134 that there is no undecoded thumbnail image in the built-in memory.

If it is determined in step S134 that there is no undecoded thumbnail image in the built-in memory, the processing ends.

On the other hand, if it is determined in step S133 that at least some of the thumbnail images do not exist in the built-in memory, the processing proceeds to step S137, and all the thumbnail images are reproduced from the HEIF file.

That is, in step S137, the file control unit 43 determines whether an undecoded thumbnail image exists in the HEIF file.

If it is determined in step S137 that an undecoded thumbnail image still exists in the built-in memory, the processing proceeds to step S138.

In step S138, the file control unit 43 seeks from the current location in the HEIF file to the location where the next thumbnail image exists, and the processing proceeds to step S139. Note that in step S138 performed in the beginning, a seek is performed from the top of the HEIF file, the top of the mdat box, or the like to a location where the first thumbnail image exists.

In step S139, the file control unit 43 reads one of the thumbnail images from the location after seeking in the HEIF file, and the processing proceeds to step S140.

In step S140, the file control unit 43 causes the encoding control unit 42 to decode the thumbnail image read in the immediately preceding step S139 and causes the display control unit 46 to display the thumbnail image. Then, the processing returns from step S140 to step S137, and hereinafter, the processing of steps S137 to S140 is repeated until it is determined in step S137 that there is no undecoded thumbnail image in the HEIF file.

If it is determined in step S140 that there is no undecoded thumbnail image in the HEIF file, the processing ends.

Figure 18:
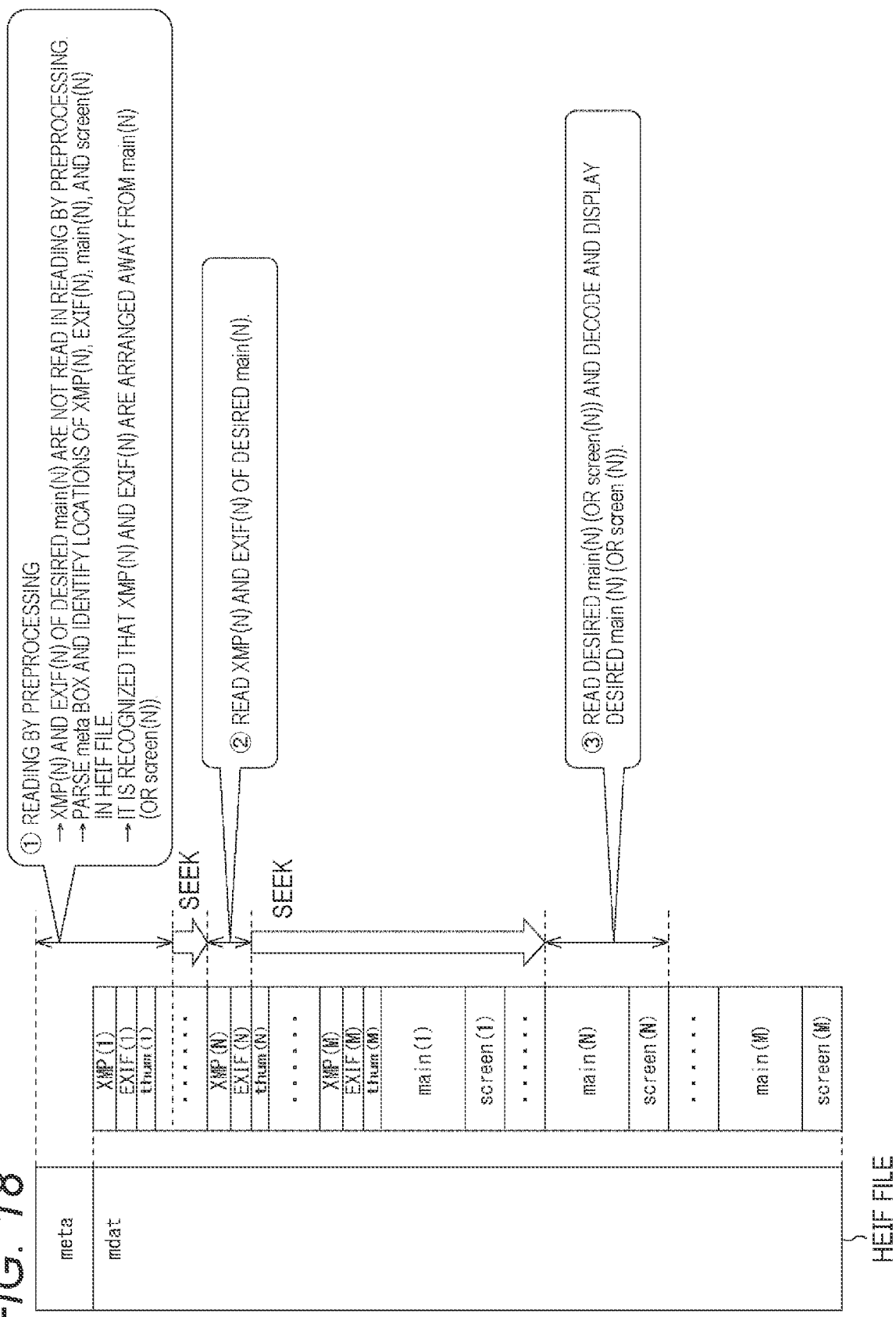
FIG. 18 is a diagram further illustrating a fourth example of generation and reproduction of a HEIF file by the file control unit 43.

FIG. 18 is a diagram for further describing the fourth example of generation and reproduction of a HEIF file by the file control unit 43.

Similarly to FIG. 14, FIG. 18 illustrates a HEIF file storing image-related data. Note, however, that in FIG. 14, the HEIF file stores image-related data associated with master images of three frames, whereas in FIG. 18, the HEIF file stores image-related data associated with master images of M frames, which is a large number of frames exceeding three frames.

The HEIF file of FIG. 18 is generated similarly to FIG. 14.

At the time of reproduction of the HEIF file as described above, the file control unit 43 performs preprocessing similarly to the reproduction of the HEIF file in FIG. 14.

In the preprocessing, data of a predetermined data amount is read from the top of the HEIF file, so that data of the meta box and the top part of the mdat box following the meta box are read and developed in the built-in memory of the file control unit 43.

In FIG. 18, since the HEIF file stores image-related data associated with master images of M frames, which is a large number of frames, it may not be possible to read all of XMP, EXIF, and thumbnail images thum of the master images of M frames in a top part of the mdat box in preprocessing.

Here, assume that the user or the like requests reproduction of an N (=<M) th master image main (N) (or screennail image screen (N)) among the M frames of master images together with XMP (N) and EXIF (N) of the master image main (N).

In this case, the file control unit 43 parses the meta box expanded in the built-in memory in the preprocessing to identify the locations of the master image main (N) (or screennail image screen (N)), the XMP (N), and the EXIF (N) in the HEIF file. As a result, it is possible to recognize that the master image main (N) (or screennail image screen (N)) is arranged away from the XMP (N) and the EXIF (N) in the HEIF file, and that the XMP (N) and the EXIF (N) of the master image main (N) are not stored in the built-in memory (not read in preprocessing).

The file control unit 43 seeks the HEIF file from a location where reading is finished in the preprocessing to a location (top position) where the XMP (N) and the EXIF (N) of the master image main (N) are arranged, and reads the XMP (N) and the EXIF (N). Furthermore, the file control unit 43 seeks the HEIF file from a location where reading of the XMP (N) and the EXIF (N) is finished to a location where the master image main (N) is arranged, and reads the master image main (N).

Thereafter, the master image main (N) is decoded and displayed together with the previously read XMP (N) and EXIF (N) of the master image main (N).

As described above, for all of the image-related data of the master images main stored in the HEIF file, in a case where a set of the XMP, EXIF, and thumbnail image thum is arranged in a top part of the mdat box, when the number of master images main stored in the HEIF file is large, the number of sets of the XMP, EXIF, and thumbnail image thum arranged in the top part of the mdat box increases, and there may be a case where some of the sets of the XMP, EXIF, and thumbnail image thum arranged in the top part of the mdat box are not read in preprocessing.

Then, in a case where reproduction of the XMP (N) and the EXIF (N) not read in the preprocessing is requested together with reproduction of the master image main (N) corresponding to the XMP (N) and the EXIF (N), two seeks occur in order to read the XMP (N) and EXIF (N), and to read the master image main (N) from the HEIF file. As a result, it takes time to display the master image main (N) together with the XMP (N) and the EXIF (N).

Figure 19:
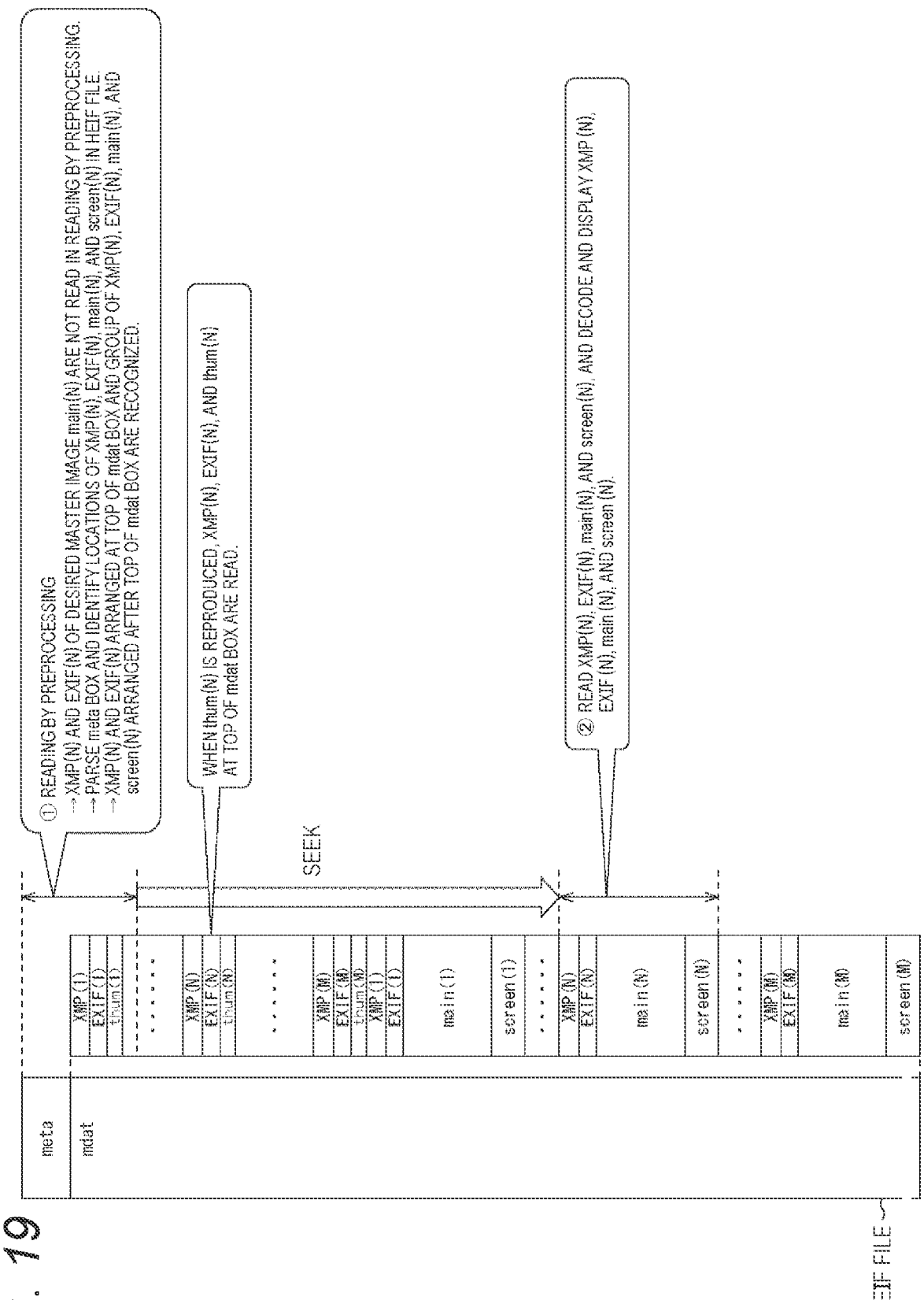
FIG. 19 is a diagram illustrating a fifth example of generation and reproduction of a HEIF file by the file control unit 43.

FIG. 19 is a diagram illustrating a fifth example of generation and reproduction of a HEIF file by the file control unit 43.

Similarly to FIG. 18, FIG. 19 illustrates a HEIF file storing image-related data associated with master images of M frames, which is a large number of frames. In FIG. 19, similarly to FIGS. 14 and 18, the arrangement order of element data in the image-related data is not specified, and XMP (m), EXIF (m), and a thumbnail image thum (m) of the element data of the image-related data are arranged in a top part of the mdat box (m=1, 2, . . . , N, . . . , M) for all the image-related data stored in the HEIF file.

Furthermore, in FIG. 19, similarly to FIGS. 14 and 18, a master image main (m) and a screennail image screen (m) of the element data of the image-related data are arranged after the top part of the mdat box for all the image-related data stored in the HEIF file. The top part of the mdat box in "after the top part of the mdat box" refers to the top part of the mdat box in which the XMP, the EXIF, and the thumbnail image thum for all image-related data stored in the HEIF file are arranged.

Note, however, that in FIG. 19, the master image main (m) and the screennail image screen (m) arranged after the top part of the mdat box are collectively arranged together with the XMP (m) and the EXIF (m).

Therefore, in FIG. 19, the XMP (m) and the EXIF (m) are arranged redundantly at the top part of the mdat box and after the top part of the mdat box. Note that the thumbnail image thum (m) can also be arranged redundantly together with the XMP (m) and the EXIF (m).

As described above, in FIG. 19, the file control unit 43 generates the HEIF file in which the XMP (m), the EXIF (m), and the thumbnail image thum (m) are arranged in the top part of the mdat box, and the XMP (m), the EXIF (m), the master image main (m), and the screennail image screen (m) are arranged after the top part of the mdat box in a collective form for all the image-related data associated with the master images of the M frames.

Note that in FIG. 19, the XMP (m), the EXIF (m), the master image main (m), and the screennail image screen (m), which are the element data of the image-related data of the master image main (m) collectively arranged after the top part of the mdat box, are arranged in this order, but the arrangement order of the element data is not limited thereto.

In the HEIF file of FIG. 19, in a case of reproducing the XMP (N), the EXIF (N), and the thumbnail image thum (N), for example, the XMP (N), the EXIF (N), and the thumbnail image thum (N) arranged in the top part of the mdat box are read in preprocessing, and when the XMP (N), the EXIF (N), and the thumbnail image thum (N) are developed in the built-in memory, the XMP (N), the EXIF (N), and the thumbnail image thum (N) are read from the built-in memory. In this case, the XMP (N), the EXIF (N), and the thumbnail image thum (N) can be displayed at high speed, and the HEIF file can be reproduced efficiently.

Additionally, when the XMP (N), the EXIF (N), and the thumbnail image thum (N) arranged in the top part of the mdat box are not read in preprocessing, the XMP (N), the EXIF (N), and the thumbnail image thum (N) arranged in the top part of the mdat box are read from the HEIF file.

Here, for all of the image-related data of the master images main (m) stored in the HEIF file, in a case where a set of the XMP (m), EXIF (m), and thumbnail image thum (m) is arranged in a top part of the mdat box, when the number of master images main (m) stored in the HEIF file is large, the number of sets of the XMP (m), EXIF (m), and thumbnail image thum (m) arranged in the top part of the mdat box increases, and there may be a case where some of the sets of the XMP (m), EXIF (m), and thumbnail image thum (m) arranged in the top part of the mdat box are not read in preprocessing.

In the HEIF file of FIG. 18, in a case where XMP (N), EXIF (N), and a thumbnail image thum (N) included in image-related data of a certain master image main (N) are not read in preprocessing, as described with reference to FIG. 18, when the master image main (N) (or screennail image screen (N)) is reproduced together with the XMP (N) and the EXIF (N) of the master image main (N), two seeks occur in order to read the XMP (N) and EXIF (N), and to read the master image main (N) from the HEIF file.

On the other hand, in the HEIF file of FIG. 19, the XMP (N) and the EXIF (N) are arranged not only in the top part of the mdat box, but also after the top part of the mdat box in a collective form together with the master image main (N) and the like.

Therefore, in the HEIF file of FIG. 19, in reading of the XMP (N), the EXIF (N), and the master image (N), all of the XMP (N), EXIF (N), master image main (N), and screennail image screen (N) collectively arranged after the top part of the mdat box are read, for example, so that the XMP (N), the EXIF (N), and the master image (N) can be read quickly in one seek.

Figure 20:
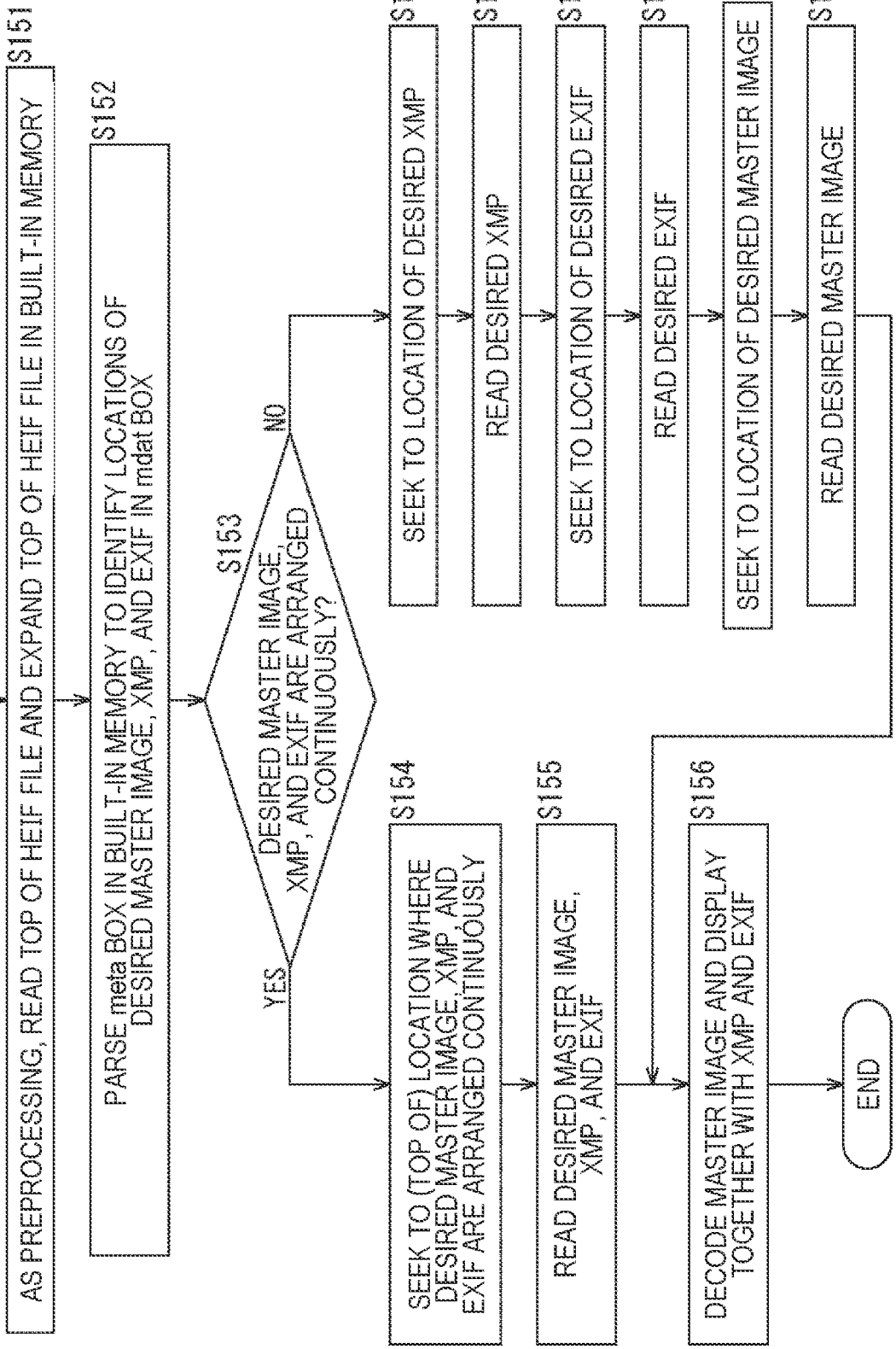
FIG. 20 is a flowchart illustrating an example of processing of reproducing a master image, XMP, and EXIF stored in a HEIF file.

FIG. 20 is a flowchart illustrating an example of processing of reproducing a master image (or screennail image), XMP, and EXIF stored in the HEIF file of FIG. 18 or 19.

In step S151, as preprocessing, the file control unit 43 reads data of a predetermined data amount in a top part of the high-speed HEIF file, and thereby reads the meta box and a top part of the mdat box following the meta box. Furthermore, the file control unit 43 expands the meta box and the top part of the mdat box read from the high-speed HEIF file in the built-in memory, and the processing proceeds from step S151 to step S152.

In step S152, the file control unit 43 parses the meta box expanded in the built-in memory to identify a location in the mdat box in which a desired master image (or screennail image), such as a master image requested to be reproduced by the user, and XMP and EXIF of the master image exist, and the processing proceeds to step S153.

In step S153, the file control unit 43 determines whether the desired master image (and screennail image), XMP, and EXIF are continuously (collectively) arranged in the HEIF file according to the parsing result of the meta box.

In step S153, if it is determined that the desired master image, XMP, and EXIF are continuously arranged in the HEIF file, that is, if the HEIF file is the HEIF file as illustrated in FIG. 19, and the XMP and the EXIF are redundantly arranged at the top part of the mdat box of the HEIF file and after the top part, the processing proceeds to step S154.

In step S154, the file control unit 43 performs a seek to the location where the desired master image, XMP, and EXIF are continuously arranged in the HEIF file, that is, (top of) the location of the desired master image, XMP, and EXIF arranged after the top part of the mdat box, and the processing proceeds to step S155.

In step S155, at the location after seeking in the HEIF file, the file control unit 43 reads the desired master image (and screennail image), XMP, and EXIF collectively arranged in the location, and the processing proceeds to step S156.

In step S156, the file control unit 43 causes the encoding control unit 42 to decode the master image read in the immediately preceding step S155. Furthermore, the file control unit 43 causes the display control unit 46 to display the decoded master image together with the XMP and EXIF read in the immediately preceding step S155, and ends the processing.

On the other hand, if it is determined in step S153 that the desired master image, XMP, and EXIF are not continuously arranged in the HEIF file, that is, if the HEIF file is the HEIF file as illustrated in FIG. 18, and the XMP and the EXIF are arranged only in the top part of the mdat box of the HEIF file, the processing proceeds to step S157.

In step S157, the file control unit 43 performs a seek to (top of) the location of the XMP of the desired master image arranged in the top part of the mdat box in the HEIF file, and the processing proceeds to step S158.

In step S158, at the location after seeking in the HEIF file, the file control unit 43 reads the XMP of the desired master image arranged in the location, and the processing proceeds to step S159.

In step S159, the file control unit 43 performs a seek to (top of) the location of the EXIF of the desired master image arranged in the top part of the mdat box of the HEIF file, and the processing proceeds to step S160.

In step S160, at the location after seeking in the HEIF file, the file control unit 43 reads the EXIF of the desired master image arranged in the location, and the processing proceeds to step S161.

In step S161, the file control unit 43 performs a seek to (top of) the location of the desired master image (or screennail image) arranged after the top part of the mdat box in the HEIF file, and the processing proceeds to step S162.

In step S162, at the location after seeking in the HEIF file, the file control unit 43 reads the desired master image arranged in the location, and the processing proceeds to step S156.

In this case, in step S156, the file control unit 43 causes the encoding control unit 42 to decode the master image read in the immediately preceding step S162. Furthermore, the file control unit 43 causes the display control unit 46 to display the decoded master image together with the XMP and the EXIF read in the immediately preceding steps S158 and S160, and ends the processing.

<Description of Computer to which Present Technology is Applied>

Next, the above-described series of processing can be performed by hardware or software. In a case where the series of processing is performed by software, a program that is included in the software is installed on a general-purpose computer or the like.

Figure 21:
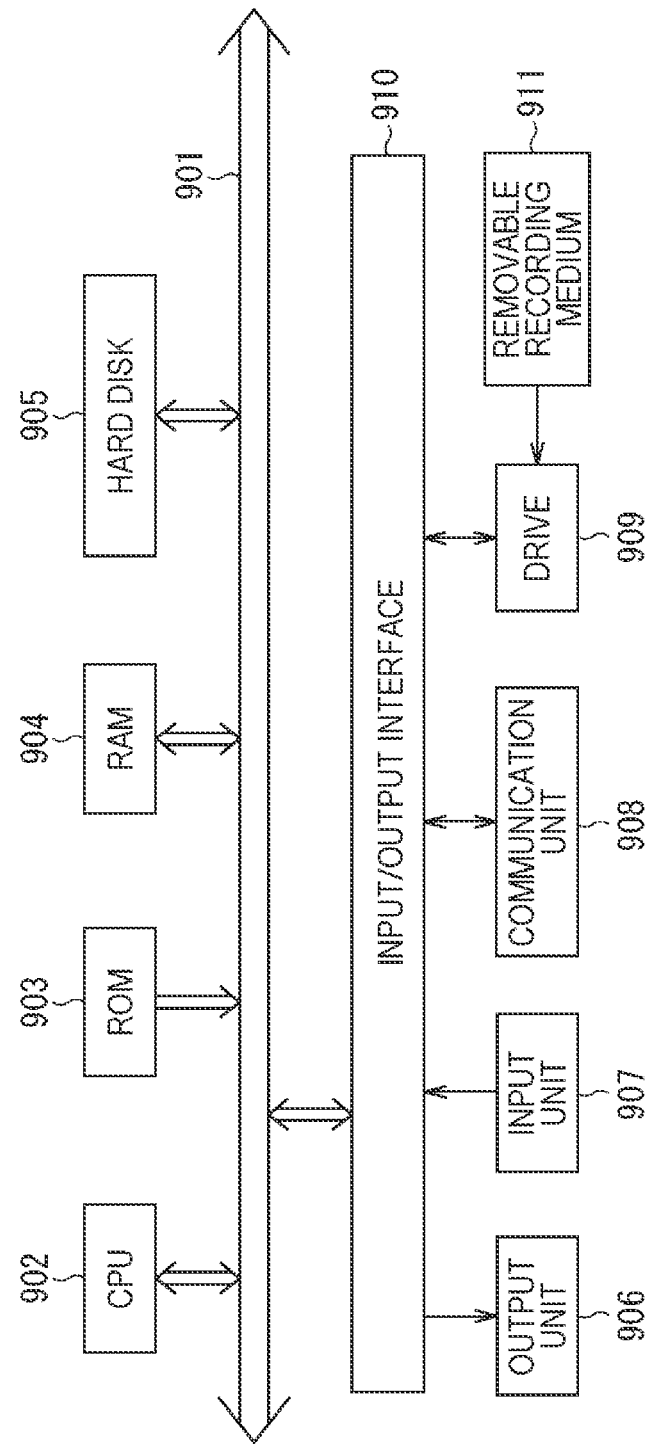
FIG. 21 is a block diagram illustrating a configuration example of one embodiment of a computer to which the present technology is applied.

FIG. 21 is a block diagram illustrating a configuration example of one embodiment of a computer on which a program for executing the above-described series of processing is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called package software. Here, examples of the removable recording medium 911 include a flexible disk, a compact disc read only memory (CD-ROM), a magneto optical (MO) disk, a digital versatile disc (DVD), a magnetic disk, a semiconductor memory, and the like.

Note that the program can be installed on the computer from the removable recording medium 911 as described above, or can be downloaded to the computer through a communication network or a broadcast network and installed in the built-in hard disk 905. That is, for example, the program can be wirelessly transferred from a download site to the computer through an artificial satellite for digital satellite broadcasting, or can be transferred by wire to the computer through a network such as a local area network (LAN) or the Internet.

The computer incorporates a central processing unit (CPU) 902, and an input/output interface 910 is connected to the CPU 902 through a bus 901.

When a command is input by a user operating an input unit 907 or the like through the input/output interface 910, the CPU 902 executes a program stored in the read only memory (ROM) 903 according to the command. Alternatively, the CPU 902 loads the program stored in the hard disk 905 into a random access memory (RAM) 904 and executes the program.

As a result, the CPU 902 performs the processing according to the above-described flowchart or the processing performed by the configuration of the block diagram described above. Then, the CPU 902 performs control to output the processing result from an output unit 906 or transmit the processing result from a communication unit 908 through the input/output interface 910, for example, or record the processing result in the hard disk 905, for example, as needed.

Note that the input unit 907 includes a keyboard, a mouse, a microphone, and the like. Additionally, the output unit 906 includes a liquid crystal display (LCD), a speaker, and the like.

Here, in the present specification, the processing performed by the computer according to the program is not necessarily performed in time series in the order described in the flowchart. That is, the processing performed by the computer according to the program also includes processing executed in parallel or individually (e.g., parallel processing or processing by object).

Additionally, the program may be processed by one computer (processor) or may be processed in a distributed manner by a plurality of computers. Furthermore, the program may be transferred to a remote computer to be executed.

Furthermore, in the present specification, a system means a set of a plurality of components (devices, modules (parts), and the like), and it does not matter whether or not all the components are in the same housing. Therefore, a plurality of devices accommodated in separate housings and connected through a network, and one device accommodating a plurality of modules in one housing are both systems.

Note that the embodiment of the present technology is not limited to the above-described embodiment, and various modifications can be made without departing from the scope of the present technology.

For example, the present technology can have a cloud computing configuration in which one function is shared and processed by a plurality of devices through a network.

Additionally, each step described in the above-described flowchart can be executed by one device or be executed in a shared manner by a plurality of devices.

Furthermore, in a case where a plurality of processing is included in one step, the plurality of processing included in one step can be performed by one device or be performed in a shared manner by a plurality of devices.

Additionally, the effect described in the present specification is merely an illustration and is not restrictive. Hence, other effects can be obtained.

Note that the present technology can also be configured in the following manner.

<1>
A file processing device including
a file control unit that generates a high efficiency image file format (HEIF) file in which a related image associated with an image in the HEIF file is arranged in a top part of an mdat box.

<2>
The file processing device according to <1>, in which
the file control unit generates the HEIF file in which a plurality of the related images associated with a plurality of the images is arranged in the top part of the mdat box.

<3>
The file processing device according to <1> or <2>, in which
the file control unit generates the HEIF file in which metadata of the image is also arranged in the top part of the mdat box.

<4>
The file processing device according to <3>, in which
the file control unit generates the HEIF file in which the metadata is arranged in the top part of the mdat box and after the top part of the mdat box.

<5>
The file processing device according to any one of <1> to <4>, in which
the related image includes an image having a smaller data amount than a data amount of the image.

<6>
The file processing device according to <5>, in which
the related image includes a thumbnail image.

<7>
A file processing method including
generating a high efficiency image file format (HEIF) file in which a related image associated with an image in the HEIF file is arranged in a top part of an mdat box.

<8>
A program for causing a computer to function as
a file control unit that generates a high efficiency image file format (HEIF) file in which a related image associated with an image in the HEIF file is arranged in a top part of an mdat box.

<9>
A file processing device including
a file control unit that reads a top part of a high efficiency image file format (HEIF) file in which a related image associated with an image in the HEIF file is arranged in a top part of an mdat box.

<10>

The file processing device according to <9>, in which the file control unit reads the top part of the HEIF file in which a plurality of the related images associated with a plurality of the images is arranged in the top part of the mdat box.

<11>

The file processing device according to <9> or <10>, in which the file control unit reads the top part of the HEIF file in which metadata of the image is also arranged in the top part of the mdat box.

<12>

The file processing device according to <11>, in which the file control unit reads the top part of the HEIF file in which the metadata is arranged in the top part of the mdat box and after the top part of the mdat box.

<13>

The file processing device according to any one of <9> to <12>, in which the related image includes an image having a smaller data amount than a data amount of the image.

<14>

The file processing device according to <13>, in which the related image includes a thumbnail image.

<15>

The file processing device according to any one of <9> to <14>, in which the file control unit reads a box of the HEIF file storing metadata of data stored in the mdat box and the top part of the mdat box following the box.

<16>

The file processing device according to any one of <9> to <15>, in which the file control unit reads data of a predetermined data amount in the top part of the HEIF file.

<17>

The file processing device according to <16>, in which the file control unit reads, from a top of the HEIF file, data of a data amount corresponding to the number of the images stored in the HEIF file.

<18>

The file processing device according to <16>, in which the file control unit reads, from a top of the HEIF file, data of a data amount corresponding to a capacity of a memory storing data read from the top of the HEIF file.

<19>

A file processing method including reading a top part of a high efficiency image file format (HEIF) file in which a related image associated with an image in the HEIF file is arranged in a top part of an mdat box.

<20>

A program for causing a computer to function as a file control unit that reads a top part of a high efficiency image file format (HEIF) file in which a related image associated with an image in the HEIF file is arranged in a top part of an mdat box.

REFERENCE SIGNS LIST

10 Digital camera
11 Optical system
13 Signal processing unit
14 Media
15, 16 I/F
17 Button/key
18 Touch panel
19 Liquid crystal panel
20 View finder
21 I/F
41 Optical system/image sensor control unit
42 Encoding control unit
43 File control unit
44 Media control unit
45 Operation control unit
46 Display control unit
47 UI control unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A file processing device comprising:
a file control unit that generates a high efficiency image file format (HEIF) file in which a related image associated with an image in the HEIF file is arranged in a top part of an mdat box and in which metadata of the image is arranged in the top part of the mdat box.

2. The file processing device according to claim 1, wherein the image is one of a plurality of images, the related image is one of a plurality of related images, and the file control unit generates the HEIF file in which the plurality of related images associated with the plurality of images is arranged in the top part of the mdat box.

3. The file processing device according to claim 1, wherein the file control unit generates the HEIF file in which additional metadata is arranged after the top part of the mdat box.

4. The file processing device according to claim 1, wherein the related image includes an image having a smaller data amount than a data amount of the image.

5. The file processing device according to claim 4, wherein the related image includes a thumbnail image.

6. A file processing method comprising:
generating a high efficiency image file format (HEIF) file in which a related image associated with an image in the HEIF file is arranged in a top part of an mdat box and in which metadata of the image is arranged in the top part of the mdat box.

7. A non-transitory computer readable medium storing a program, the program being executable by a computer to perform operations comprising:
generating a high efficiency image file format (HEIF) file in which a related image associated with an image in the HEIF file is arranged in a top part of an mdat box and in which metadata of the image is arranged in the top part of the mdat box.

8. A file processing device comprising:
a file control unit that reads a top part of a high efficiency image file format (HEIF) file in which a related image associated with an image in the HEIF file is arranged in a top part of an mdat box and in which metadata of the image is arranged in the top part of the mdat box.

9. The file processing device according to claim 8, wherein the image is one of a plurality of images, the related image is one of a plurality of related images, and the file control unit reads the top part of the HEIF file in which the plurality of related images associated with the plurality of images is arranged in the top part of the mdat box.

10. The file processing device according to claim 8, wherein the file control unit reads the top part of the HEIF file in which additional metadata is arranged after the top part of the mdat box.

11. The file processing device according to claim 8, wherein the related image includes an image having a smaller data amount than a data amount of the image.

12. The file processing device according to claim 11, wherein the related image includes a thumbnail image.

13. The file processing device according to claim 8, wherein the file control unit reads a box of the HEIF file storing metadata of data stored in the mdat box and the top part of the mdat box following the box.

14. The file processing device according to claim 8, wherein the file control unit reads data of a predetermined data amount in the top part of the HEIF file.

15. The file processing device according to claim 14, wherein the file control unit reads, from a top of the HEIF file, data of a data amount corresponding to the number of the images stored in the HEIF file.

16. The file processing device according to claim 14, wherein the file control unit reads, from a top of the HEIF file, data of a data amount corresponding to a capacity of a memory storing data read from the top of the HEIF file.

17. A file processing method comprising:
reading a top part of a high efficiency image file format (HEIF) file in which a related image associated with an image in the HEIF file is arranged in a top part of an mdat box and in which metadata of the image is arranged in the top part of the mdat box.

18. A non-transitory computer readable medium storing a program, the program being executable by a computer to perform operations comprising:
reading a top part of a high efficiency image file format (HEIF) file in which a related image associated with an image in the HEIF file is arranged in a top part of an mdat box and in which metadata of the image is arranged in the top part of the mdat box.

* * * * *